United States Patent
Chann et al.

(10) Patent No.: US 9,443,337 B2
(45) Date of Patent: Sep. 13, 2016

(54) RUN-TIME TECHNIQUES FOR PLAYING LARGE-SCALE CLOUD-BASED ANIMATIONS

(71) Applicant: ToyTalk, Inc., San Francisco, CA (US)

(72) Inventors: Michael Chann, San Francisco, CA (US); Jon Collins, San Francisco, CA (US); Benjamin Morse, Berkeley, CA (US); Lucas R. A. Ives, Menlo Park, CA (US); Martin Reddy, San Francisco, CA (US); Oren M. Jacob, Piedmont, CA (US)

(73) Assignee: PULLSTRING, INC., San Francisco, CA (US)

( * ) Notice: Subject to any disclaimer, the term of this patent is extended or adjusted under 35 U.S.C. 154(b) by 73 days.

(21) Appl. No.: 14/289,484

(22) Filed: May 28, 2014

(65) Prior Publication Data
US 2015/0062131 A1 Mar. 5, 2015

Related U.S. Application Data

(60) Provisional application No. 61/874,314, filed on Sep. 5, 2013.

(51) Int. Cl.
| G06T 15/00 | (2011.01) |
| G06T 13/00 | (2011.01) |
| H04N 21/81 | (2011.01) |
| H04N 21/8541 | (2011.01) |
| A63F 13/60 | (2014.01) |

(52) U.S. Cl.
CPC .............. *G06T 13/00* (2013.01); *A63F 13/60* (2014.09); *H04N 21/8146* (2013.01); *H04N 21/8541* (2013.01); *G06T 2213/08* (2013.01)

(58) Field of Classification Search
CPC .... A63F 13/00; G06T 2213/08; G06T 13/00
USPC ......................................... 345/473, 474, 475
See application file for complete search history.

(56) References Cited

U.S. PATENT DOCUMENTS

| 6,232,965 | B1 | 5/2001 | Scott et al. |
| 6,320,598 | B2 | 11/2001 | Davis et al. |
| 7,515,733 | B2 * | 4/2009 | Rhoads ............ G06F 17/30876 382/100 |
| 7,827,034 | B1 | 11/2010 | Munns et al. |
| 8,368,815 | B2 * | 2/2013 | Tsurumi ............ G06K 9/00335 348/699 |
| 8,462,163 | B2 | 6/2013 | Ito et al. |

(Continued)

OTHER PUBLICATIONS

Non-Final Office Action mailed Nov. 20, 2015, U.S. Appl. No. 14/289,487 by Chann, M. et al., filed May 28, 2014.

(Continued)

*Primary Examiner* — Phu K Nguyen
(74) *Attorney, Agent, or Firm* — Perkins Coie LLP

(57) ABSTRACT

Various of the disclosed embodiments relate to systems and methods for providing animated multimedia, e.g. animated shows, to an audience over a network. Particularly, some embodiments provide systems and methods for generating and providing audio, animation, and other experience-related information so that user's may readily experience the content in a seamless manner (e.g., as an audience member watching a show, playing a video game, etc.). Various embodiments animate "to the audience" based, e.g., on what content the audience is consuming. The animations may be generated in real-time from constituent components and assets in response to user behavior.

20 Claims, 31 Drawing Sheets

(56) References Cited

U.S. PATENT DOCUMENTS

| | | | | |
|---|---|---|---|---|
| 8,532,464 B2* | 9/2013 | Randall | ............... | G11B 27/105 386/248 |
| 8,855,460 B2* | 10/2014 | Lussier | ............... | G11B 27/034 386/200 |
| 8,910,051 B2* | 12/2014 | Lussier | ............... | G11B 27/034 386/281 |
| 9,021,052 B2* | 4/2015 | Grosz | ............... | G06F 3/0484 709/213 |
| 9,032,300 B2 | 5/2015 | Groszko et al. | | |
| 9,153,289 B2* | 10/2015 | Tsurumi | ............. | G06K 9/00335 |
| 2014/0272827 A1 | 9/2014 | Jacobs et al. | | |
| 2015/0062132 A1 | 3/2015 | Chann et al. | | |

OTHER PUBLICATIONS

Notice of Allowance mailed Apr. 29, 2016, for U.S. Appl. No. 14/289,487 by Chann, M. et al., filed May 28, 2014.

Deng, Zhigang et al., "eFASE: Expressive Facial Animation Synthesis and Editing with Phoneme-Isomap Controls", ACM SIGGRAP, University of Houston, University of Southern California, 2006, pp. 251-260, 370.

* cited by examiner

FIG. 21

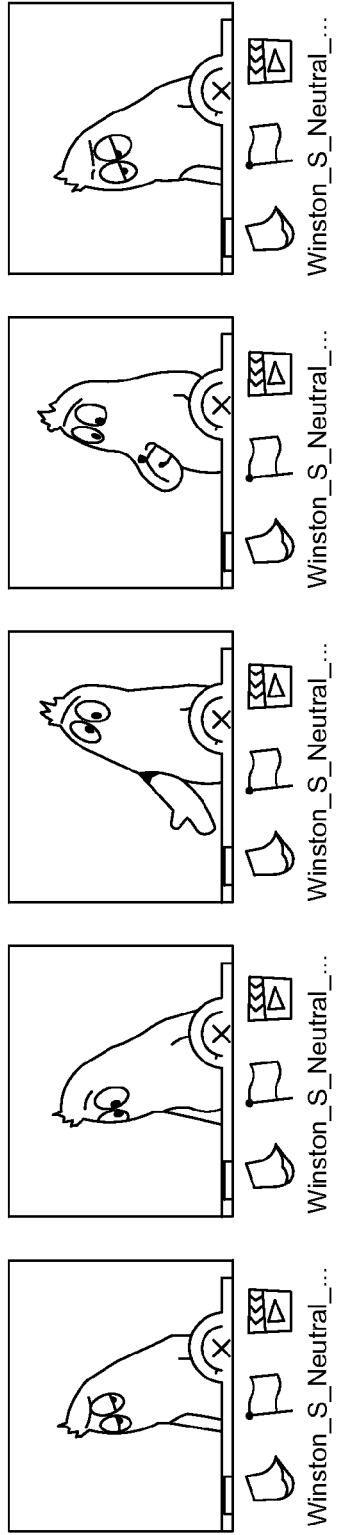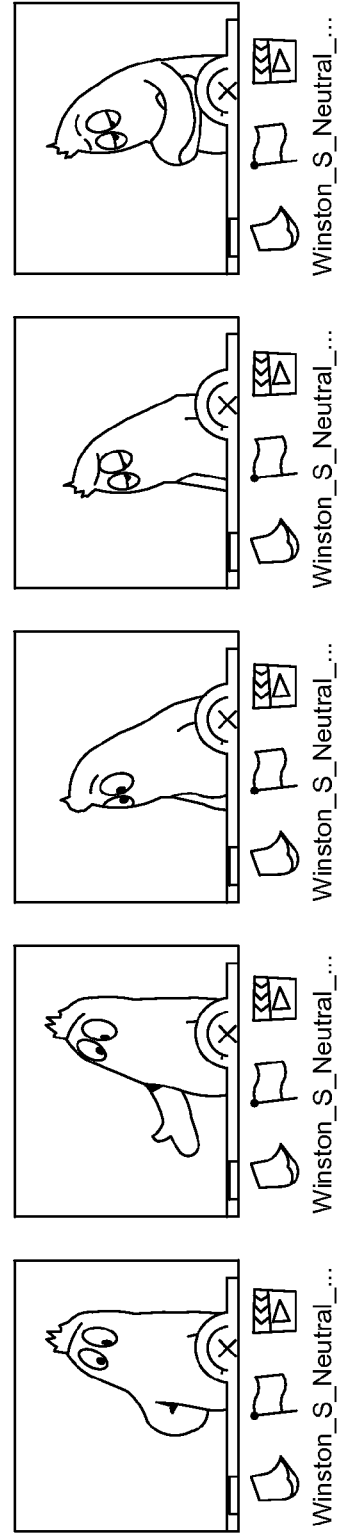
FIG. 24

2700

- ✱ Start Conversation
  - ▶ 🔊 Play Sound Effect: SHORTS_Crayons_s02_PM-ws1401_02:1.m4a; [Block]
    - ▶ ✓ Blue: Ooooh. Man.
      - ▶ ✓ Red: Hahaha! Hey Yellow. Check it out! Blue's a flathead. Whaddup, flathead?
        - Blue: I..I don't...I can't even...ta uh. She just kept coloring and coloring and using So. Much. Blue! Yellow, shed some light on this for me.
          - ▶ ✓ What What could she have been drawing?
            - ▶ ❓ sky
              - ▶ ✓ Blue: Sky. Yahh, wouldn't be the first time. She LOVES that bright blue sky. She used to draw sunsets. What's wrong with a nice sunset?
                - ▶ ✓ Purple: Huhhhhhh. What's right with one? That's what I wanna know.
                  - Red: Shuddup, Purple! Gah, so moody!
            - ❓ river
            - ❓ lake
            - ▶ ❓ tube
              - Blue: BuH! Oh, man, I hate the water. Why can't she ever draw sunsets? I mean, what's wrong with a sunset every once in a while?
            - ❓ whale
            - ❓ shark
            - ▶ ❓ dolphin
              - Blue: Sea life. Yeahhh, that figures. Boy does she have a thing for the ocean. Why can't it ever be an octopus? What's so wrong with a octopus?
            - ▶ ❓ (fallback)
              - Red: Haha. Well, she's turned Blue into a shorty. Hahaha. Shorty.
                - ▶ ✓ Blue: I dunno. Sometimes coloring time just peels my label. Hey, Yellow, you're always so sunny and happy. What's your secret?

FIG. 29

RUN-TIME TECHNIQUES FOR PLAYING LARGE-SCALE CLOUD-BASED ANIMATIONS

CROSS-REFERENCE TO RELATED APPLICATIONS

This application is entitled to the benefit of and claims priority to U.S. Provisional Patent Application No. 61/874,314, entitled "LARGE-SCALE CLOUD-BASED ANIMATION SYSTEM" filed Sep. 5, 2013, the contents of which are incorporated herein by reference in their entirety for all purposes.

FIELD

Various of the disclosed embodiments relate to systems and methods for improving the creation, distribution, and implementation of an interactive animated experience. Some embodiments are particularly well-suited for efficiently generating large volumes of assets for an interactive application.

BACKGROUND

Animation has historically been an arduous and time-intensive process, often involving hundreds of full-time animators and expensive, dedicated machinery. The widespread availability of computer systems has alleviated some of this tedium for 2D animation and has introduced the more automated processes of 3D animation. However, the process pipelines to create, e.g., a feature length movie, remain expensive, complicated and for the most part inaccessible to small teams, particularly small teams seeking to generate considerable content in a short space of time.

Furthermore, animated experiences and sequences have traditionally been distributed in isolated bundles. Feature films are released in theater or in DVD and video games are distributed in isolated installments with large lag times between successive patches and updates. A developer seeking to push large amounts of content to a user on a regular basis and to modify and update that content, must contend with tools designed for slower and larger projects.

If one desires to distribute interactive animated features to user devices across the internet, a considerable amount of dialogue and animation information may need to be generated and packaged in a form differing considerably from traditional distribution methods. Given this amount of content and the small size of many user devices (iPADs®, iPhones®, etc.), as well as the small amount of bandwidth often available, the traditional approach to content generation is generally unsuitable. Accordingly, there is a need for content generation systems and methods that efficiently generate large quantities of content able to be implemented on remote devices.

BRIEF DESCRIPTION OF THE DRAWINGS

One or more embodiments of the present disclosure are illustrated by way of example and not limitation in the figures of the accompanying drawings, in which like references indicate similar elements.

FIG. 21 is a "Pose Library" interface created inside of a development environment, e.g. Maya®, to define which clips will appear in a user device as may be used in some embodiments.

FIG. 24 is an interface to manage animation clips as implemented in some embodiments.

FIG. 27 is an example conversation flow as may occur in some embodiments.

FIG. 28 is a screenshot for an interface to generate and tag audio assets for a single character as implemented in some embodiments.

FIG. 29 is a screenshot for an interface to generate and tag audio assets for multiple characters as implemented in some embodiments.

Figure 1:
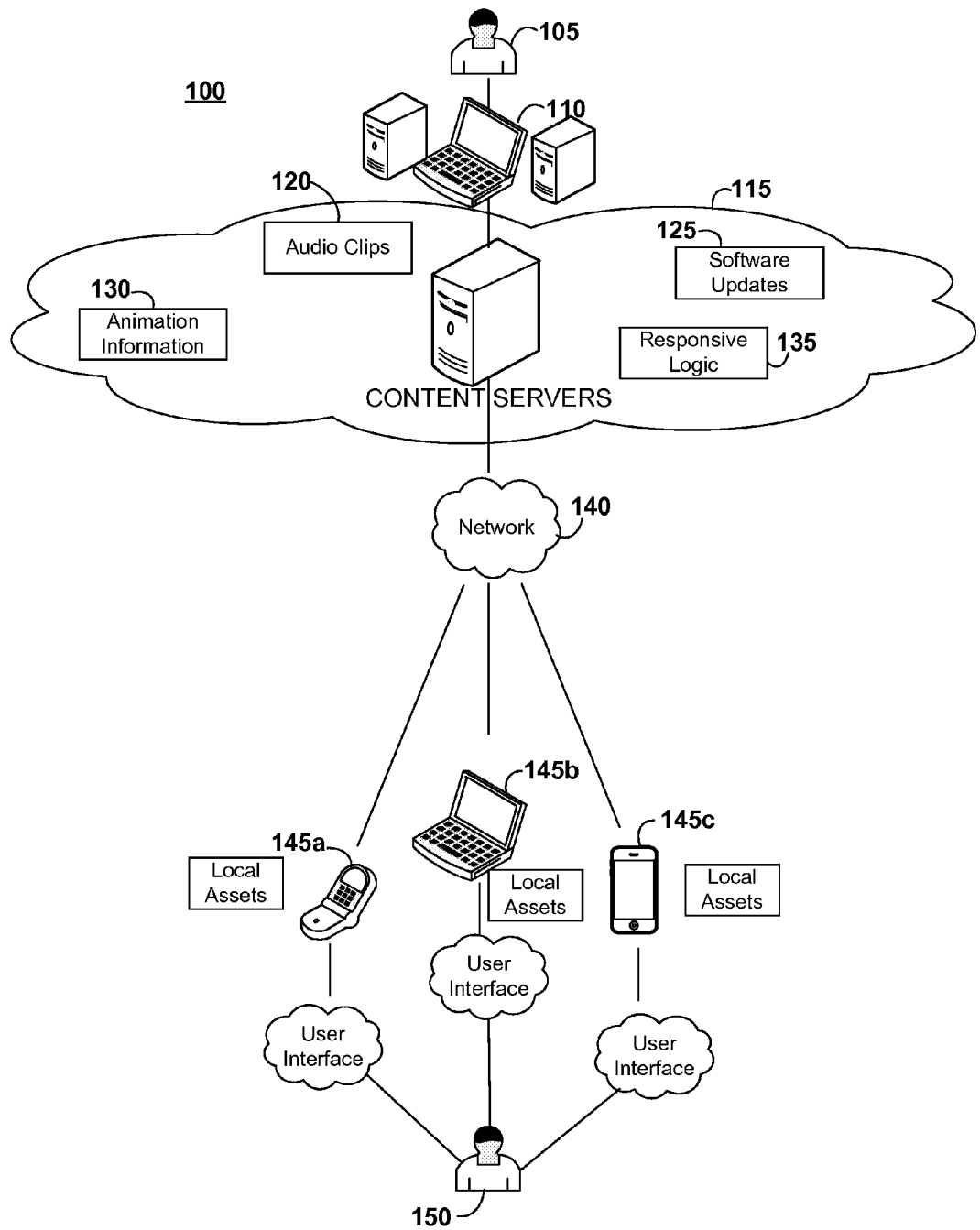
FIG. 1 illustrates a content delivery and feedback topology as contemplated in some embodiments.

Those skilled in the art will appreciate that the logic and process steps illustrated in the various flow diagrams discussed below may be altered in a variety of ways. For example, the order of the logic may be rearranged, substeps may be performed in parallel, illustrated logic may be omitted, other logic may be included, etc. One will recognize that certain steps may be consolidated into a single step and that actions represented by a single step may be alternatively represented as a collection of substeps. The figures are designed to make the disclosed concepts more comprehensible to a human reader. Those skilled in the art will appreciate that actual data structures used to store this information may differ from the figures and/or tables shown, in that they, for example, may be organized in a different manner; may contain more or less information than shown; may be compressed and/or encrypted; etc.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment. Such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Though the terms "software" and "firmware" may be referred to in isolation, one will recognize that the same systems and techniques disclosed herein may readily be applied to each interchangeably.

Delivery System Topology Overview

Various of the disclosed embodiments relate to systems and methods for providing animated multimedia, e.g. animated shows, to an audience over a network. Particularly, some embodiments provide systems and methods for generating and providing audio, animation, and other experience-related information so that users may readily experience the content in a seamless manner (e.g., as an audience member watching a show, playing a video game, etc.). Various embodiments animate "to the audience" based, e.g., on what content the audience is consuming. The animations may be generated in real-time from constituent components and assets in response to user behavior.

The upfront costs to create a show may be greatly reduced in some embodiments. For example, some embodiments allow a studio to continue to animate character(s) after the show is released, to write new content, add new performances, and refine already existing performances, all while the show may be up and running in-market.

FIG. 1 illustrates a content delivery and feedback topology 100 as contemplated in some embodiments. As depicted, a content provider 105 (e.g., a studio, entertainment company, graphic artist, etc.) may generate a plurality of assets with creation tools 110 and upload them to a content server system 115. The content server system 115 may be a cloud-based server system and may include various assets, e.g.: audio clips 120; animation information 130; responsive logic 135; and software updates 125. Though depicted here as a single system, the content server system 115 may comprise a wide variety of different systems, each dedicated to particular functions. Audio clips 120 may include music and waveforms from voice actors.

Responsive logic 135 may include different software modules used to provide an interactive experience to a user (e.g., different interactive "trails" as discussed herein). Software updates 125 may include general updates to ensure the compatibility of a distributed program with different hardware, as well as to push various improvements and corrections to user devices. Animation information 130 may include retargeting information, skeletal keyframes, textures, graphical assets, etc. Together, the various assets on the content servers 115 may be used to provide an end-user experience, e.g., viewing a show, playing a video game, engaging in a learning experience, etc.

The assets may be pulled or pushed across a network 140 (e.g., the Internet) from one or more user devices 145a-c, e.g., an iPad®, iPhone®, XBox®, etc. The user devices 145a-c may include cached, local copies of assets received from the content server 115 and/or local instances of software configured to provide the desired end-user experience. The user devices 145a-c may have different interfaces which may or may not be interactive. Some embodiments specifically consider interfaces permitting audio feedback from a user 150 (e.g., where the user speaks back to the user interface to provide a response). Audio and/or other feedback may be provided back to the content servers 115 from the user devices 145a-c across network 140. For example, following an interactive selection by user 150 the user device may notify the content server of the selection and new assets may be pulled from the content server system 115, possibly to replace local assets that are no longer necessary or as likely to be used locally.

Example Animation Scene

Figure 2:
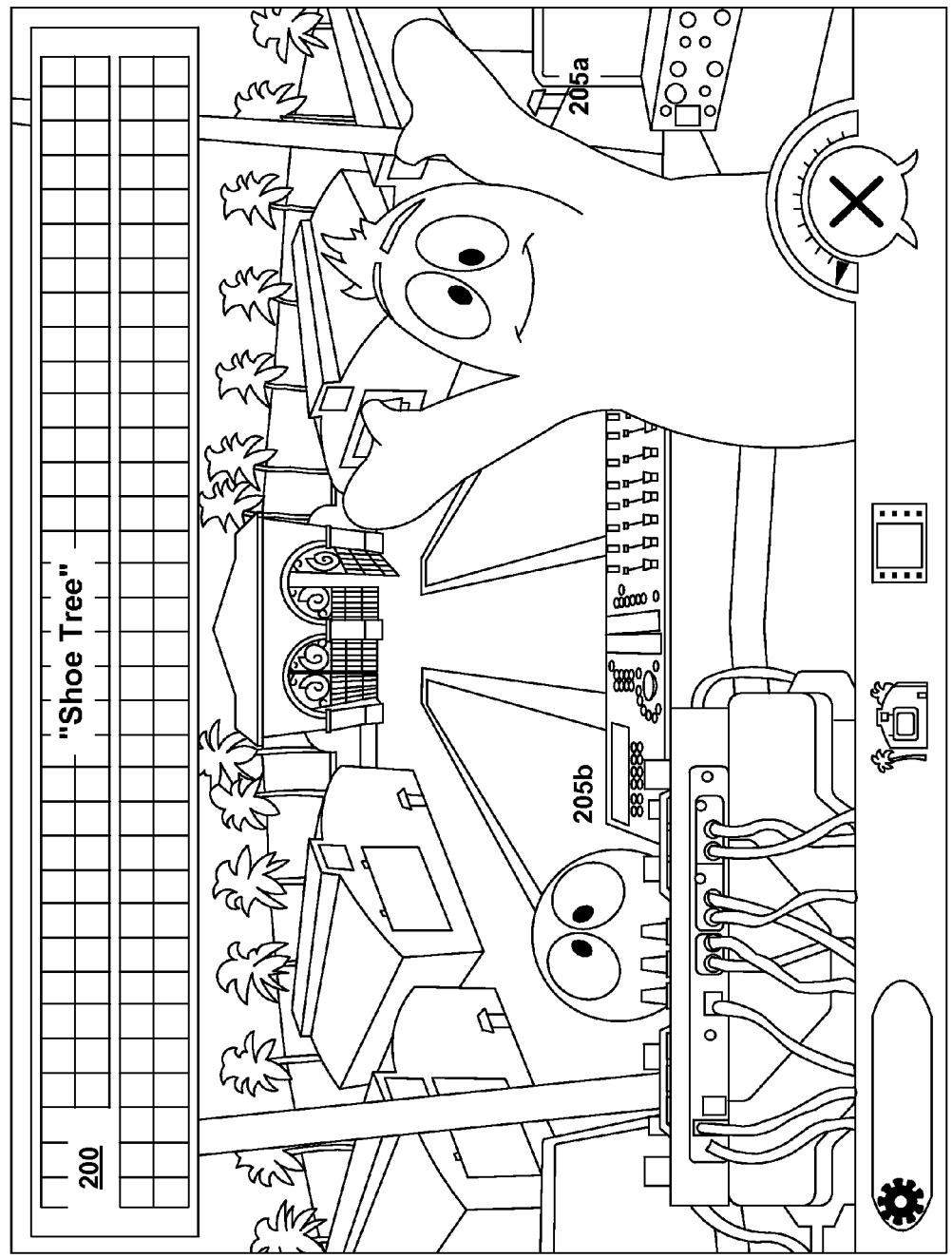
FIG. 2 is a screenshot of the rendered animation scene as may appear at a user device in some embodiments.

FIG. 2 is a screenshot of the rendered animation scene as may appear at a user device 145a-c in some embodiments. The graphical assets may comprise 2D and 3D components. For example, the background may be a static 2D image, while the foreground includes 3D animated characters 205a,b (who may themselves rely upon 2D textures as discussed in greater detail herein). The quality of each of the assets, e.g., the compression rate of the 2D assets, the vertex count of the 3D assets, the amount of interpolation of the 3D animations, etc., may depend upon a number of factors discussed herein, including the hardware capabilities of the user device 145a-c and the quality of the network connection across the network 140.

Server Side—General Asset Generation and Delivery Pipeline Example

Figure 3:
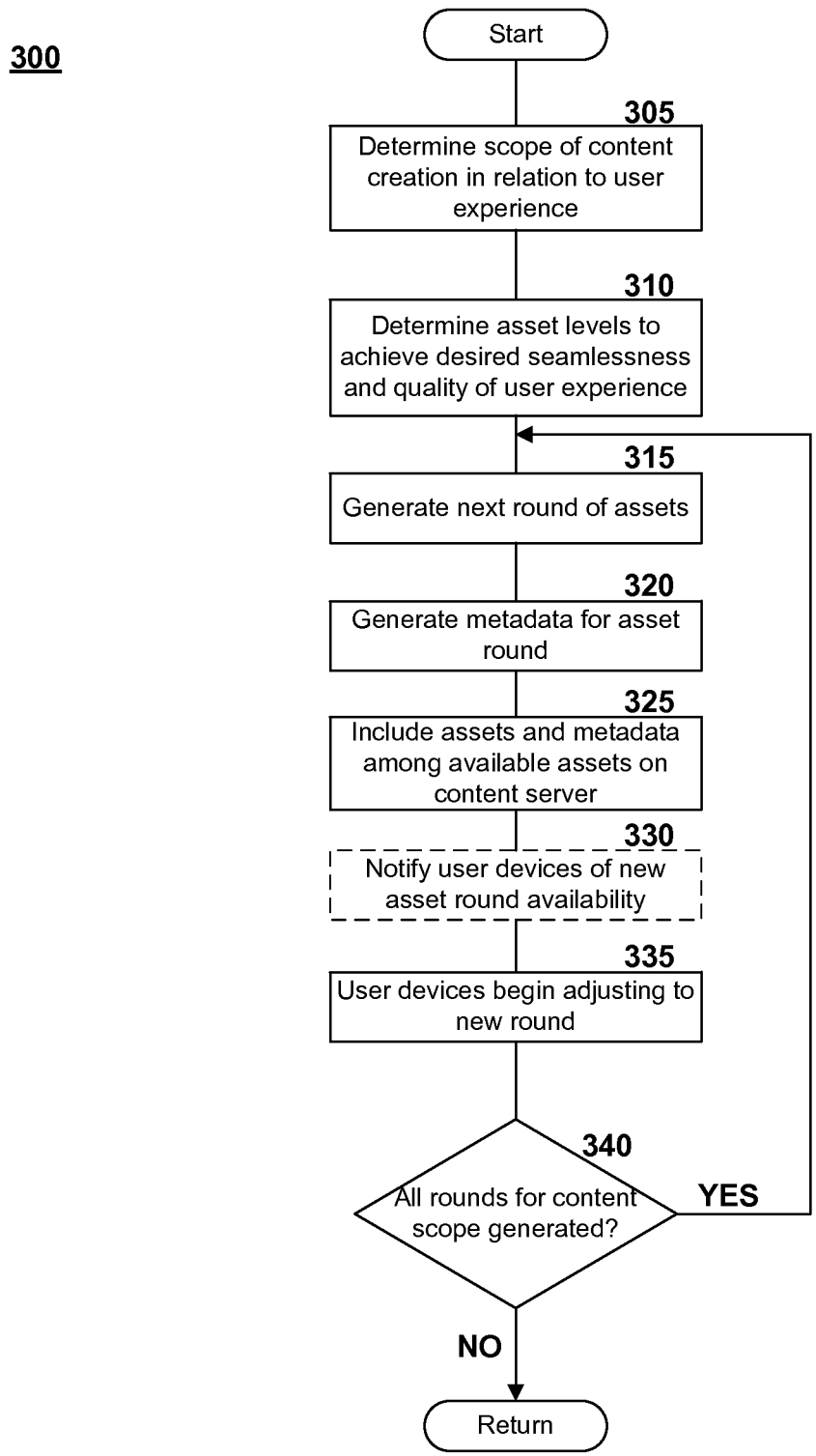
FIG. 3 is a flow diagram depicting a general process by which content is created and provided to user devices as contemplated in some embodiments.

FIG. 3 is a flow diagram depicting a general process by which content is created and provided to user devices as contemplated in some embodiments. At block 305, content creators may determine the scope of the content creation they intend to generate for a user experience. For example, where the user experience is an interactive video game, the creators may consider the content to be generated for a single episode. This content may rely on various previously created assets, but may also depend on new assets.

At block 310, the content creators may determine the levels of asset fidelity necessary to achieve the desired quality and seamlessness of the user experience. For example, an interactive experience may comprise a number of paths and environments the user may explore. Some paths may be hidden or comprise "Easter eggs" which are unlikely to be accessed by the user until long after the initial deployment. Similarly, some levels of fidelity and accuracy may not be necessary for the initial release. Conversely, the initial release may only be made available to users having high-end hardware and network connections. Lower fidelity versions of the assets may be generated in a later round of distribution.

Having organized the assets into a total, or partial, ordering of rounds for generation, at block 315 the content creators may begin generating the first/next round of assets. At block 320, the creators may generate the metadata for the asset round (or this may be accomplished automatically as discussed in greater detail herein). This metadata may be used by the user devices to anticipate the receipt of future rounds and the relevant associations between assets of different rounds. At block 325, the creators may include the assets and metadata among the available assets on the content server. At block 330, the sever system may notify the user devices of the new round's availability. Alternatively, the user devices may passively become aware of the new assets as they contact the server. In some embodiments, the users may request the new rounds explicitly.

At block 335, the user devices begin adjusting to the new round as discussed in greater detail herein.

At block 340, if all rounds of content have been generated by the creators then the process may end. Alternatively, the process may continue with the next round if additional rounds remain. Thus, successive rounds may make higher/lower fidelity assets and/or more assets available to the user devices.

Server Side Animation System Components

Figure 4:
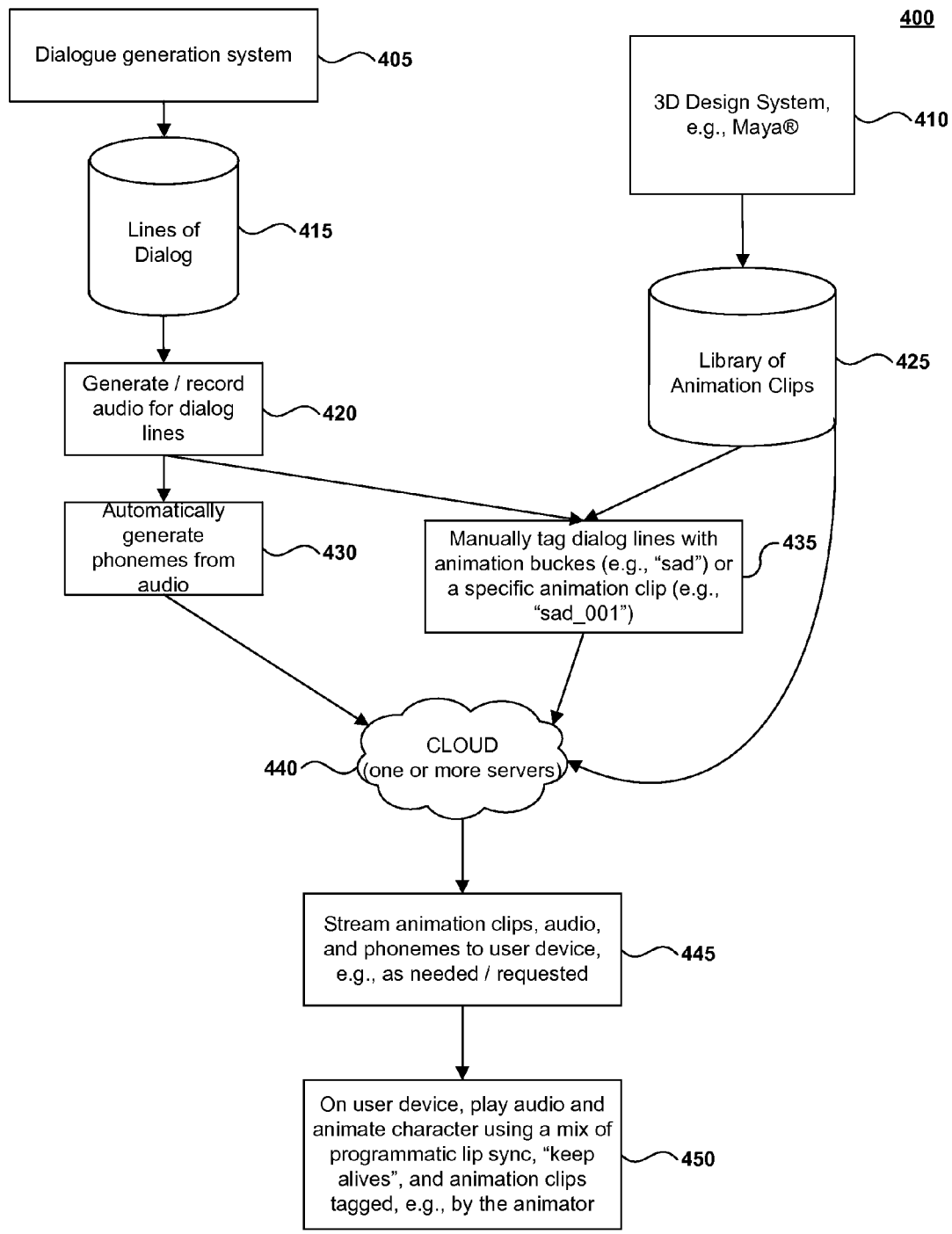
FIG. 4 is a block diagram depicting the relationships between various modules and components in an animation delivery framework as contemplated in some embodiments.

FIG. 4 is a block diagram depicting the relationships between various modules and components in an animation delivery framework as contemplated in some embodiments. Developers may use a dialogue generation system 405 to write lines of dialogue 415. These lines may be stored and subsequently read by an actor to generate audio 420. Phonemes may be generated from these audio waveforms for use in lip syncing 430. For example, the system may automatically identify phonemes corresponding to the dialogue text itself or to the waveform of the spoken dialogue text.

3D models and corresponding animations may be created with a design system 410 and stored as a library of animation clips 425. In some embodiments, a developer may manually tag dialog lines with animation buckets 435 as discussed herein. These elements may individually or collectively be stored in the cloud 440, which may comprise one or more servers depending upon the embodiment.

The assets may be streamed 445 to a user device as needed or requested, e.g. when an application running on the user device makes a request to a server for more assets and/or logic. These elements may be provided to the user device and used to present the user with a desired animation experience 450.

Figure 5:
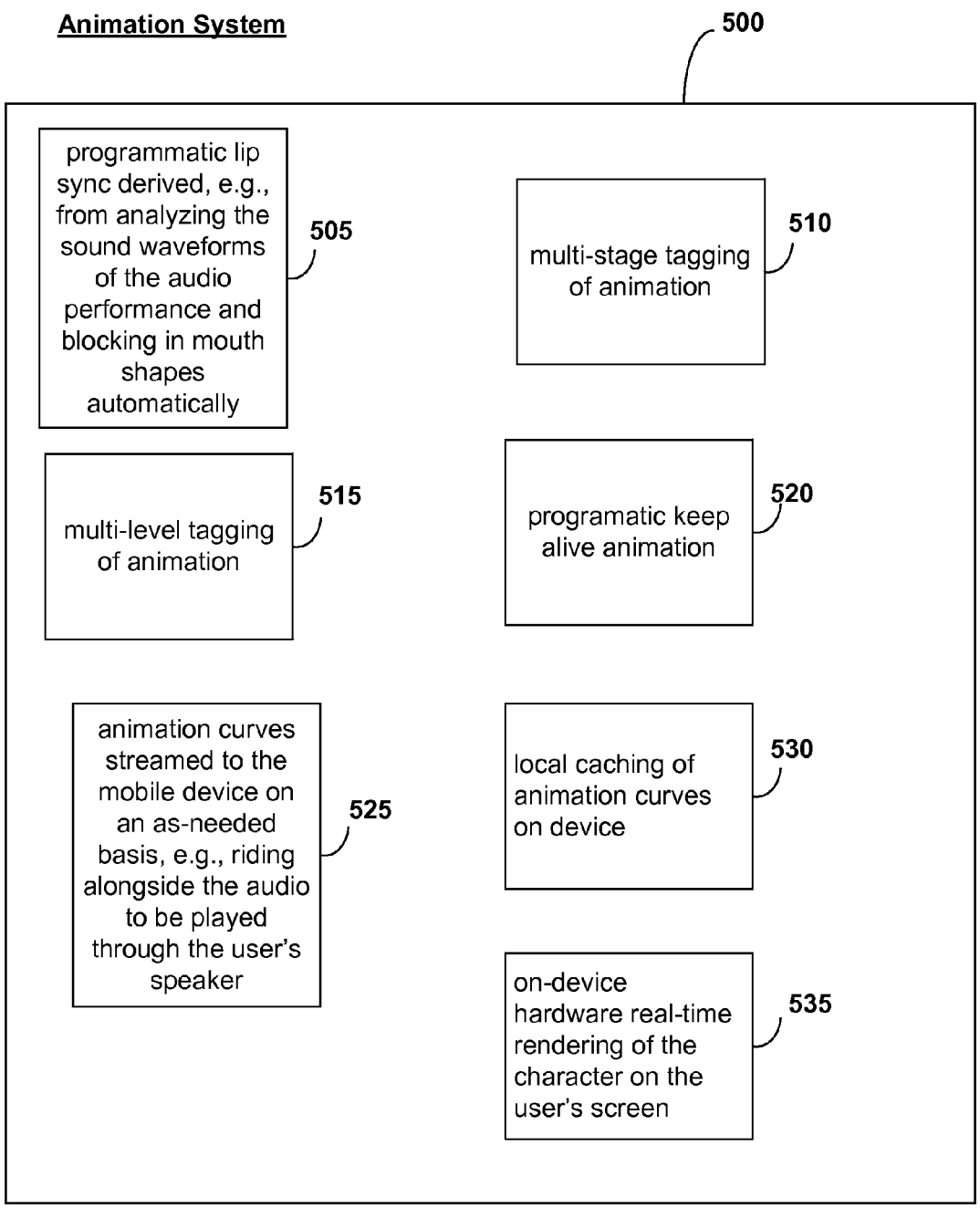
FIG. 5 is a block diagram depicting various features and components in an animation asset management system as contemplated in some embodiments.

FIG. 5 is a block diagram depicting various features and components in an animation asset management system 500 as contemplated in some embodiments (some components may appear on the server and some on the user device). For example, the animation information assets 130 in content servers 115 may be managed by an animation asset management system 500 in response to various feedback from the user 105. For example, animated characters may rely on lip synchronization information as described in greater detail herein. Accordingly, animation asset management system 500 may manage a programmatic lip synchronization module 505 to deliver the synchronization information as necessary. The system may employ programmatic lip syncing, whereby animation information is derived from the analysis of a waveform, such as a speech waveform. The lip sync information may be derived from analyzing the sound waveforms of an audio performance and blocking in mouth shapes (e.g., texture or vertex animation keyframes) automatically. This analysis may be performed locally at a user device or at servers and may reduce the work required by animators to create audio specific information. The lip sync may comprise vertex offsets, bone movements, etc. in an animation system. In some embodiments the sync information may be appended to an existing animation.

A multi-level tagging module 515 may also be used to determine the appropriate quality of animation to deliver to the user. A multi-stage tagging module 510 may also be used to quickly identify animations corresponding to different stages of interaction as discussed herein. Each of these modules' operations are described in greater detail herein.

A programmatic keep alive animation module 520 may be used to identify which animation assets are suitable for a character when the character is to display a quiescent state (e.g., when waiting for a user response). Examples of keep alive animations include: the character blinking; the character looking around; the character twitching; the character shifting their weight; the character sighing; etc.

A local animation curve caching module 530 may be used to dictate which animation sequences or "curves" are to be locally cached on the user device. For example, based on the most likely animations the user is likely to encounter given their current experience context, different animations may be proactively stored on the user device to maintain a seamless experience. The local animation curve caching module 530 may operate in conjunction with a module 525 indicating when the curves are to be streamed to the mobile device. For example, the optimal time to transmit a large animation (as well as audio, or other asset data), may not occur immediately, but may take place in the future. Accordingly, the streaming module 525 may be used to balance the need for caching local animations on the user device to generate a seamless experience, with the bandwidth limitations of the network.

An on-device hardware, real-time rendering module 535 may also be used to coordinate content delivery with the rendering capabilities and graphics processing pipeline requirements of the user device. For example, user devices requiring additional time to render an animation may have their to-be-delivered assets advanced in queue.

In some embodiments, retargeting information may also be used to reduce animator workload. For example, a single animation may be retargeted to a plurality of characters and weighted accordingly. Some embodiments implement on-device real-time hardware rendering in order to animate the character on the user's device screen.

The animations may employ multi-layer tagging of animation, such as tagging body animations separately from facial animations on different layers. The animation system may also employ multi-level tagging of animation, such as using a coarse level tagging (e.g., "sad") or a specific level tagging (e.g., "sad_001"). Various of the disclosed embodiments provide systems and methods that may be used to deliver many hours (in some embodiments 6+ hours) of animated character content in sync with the audio. The animation system may also employ multi-level tagging of animation. For example, animations may be tagged relative to the hierarchy of FIG. 10.

Programmatic keep alive animations may also be used. For example, a character in the animation may be made to blink, cough, shuffle their feet, etc. so as to give the appearance of a living being in-between responses.

Animation clips may be streamed to the mobile device on as as-needed basis, e.g., riding alongside the audio to be played on the speakers of the user device. In some embodiments, animation clips corresponding to programmatically determined lip sync information may be placed in a same packet as the corresponding audio information. Thus, the user devices need not retain copies of all animations in local memory, but may dynamically receive new and/or updated material.

Figure 10:
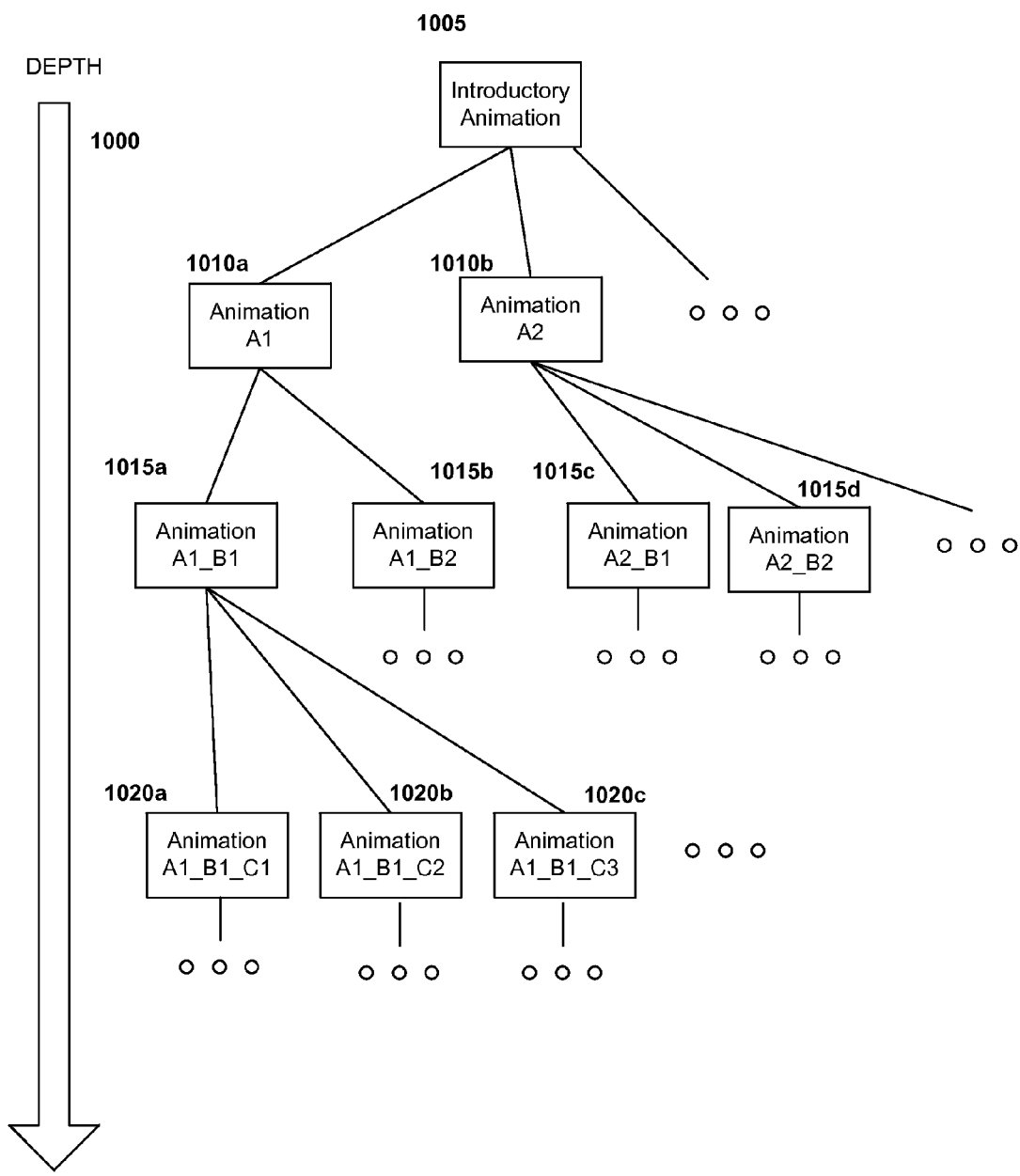
FIG. 10 is a block diagram depicting the relationships between various animation asset groups and an engine as contemplated in some embodiments.

In some embodiments, animation clips (e.g., a succession of keypoints or keyframes) and other assets (e.g. audio) are cached locally on the user device for subsequent use. For example, where the system determines that an animation is likely to be used again in the near future, the system may retain an acquired animation clip, for example associated with lip sync information, to be used again. The determination may be based upon a hierarchy, e.g. as depicted in FIG. 10. A user engaged in conversation with a character may traverse the hierarchy (both up and down as well as laterally). Metadata information, or a record of previous usage, may indicate that certain nodes, e.g., animations, in the hierarchy are likely to recur.

For example, the character may be asking the user to play a guessing game—as successive guesses are expected to be incorrect, the system may recognize that the animation and audio corresponding to the posing of the question may be frequently reused. Such a recognition may be specified by a content creator (e.g., by providing a Markov model, or similar state mapping with probabilities) or recognized by the system as a consequence of the user's behavior or the provided data. Similarly datasets may be "coupled", in the sense that a request for one dataset may trigger the delivery of additional datasets. A user device requesting the "guessing game" introductory animation may receive not only the introductory animation, but a corpus of related datasets that are expected to be used as a consequence of playing the guessing game. In this manner, the system may anticipate future requests and economize the use of the available bandwidth.

Some embodiments implement on-device real-time hardware rendering of the character on the user device's screen. For example, the animation may be dynamically created based on the factors described above and the associated user inputs.

With all these elements pulled together, the system may continuously update the performance of the character based on multiple sources of information, e.g., which portion of the show the audience is enjoying the most. Accordingly, various embodiments animate "to the audience" based, e.g., on what content they are consuming. Furthermore, the upfront costs to create a show may be greatly reduced. This architecture also allows a distributor to continue to animate character(s) after the show is released, as developers write new content and want to add new performances, refine already existing assets/performances, or simply change content while the show is up and running in-market.

Client Side—General Asset Incorporation Pipeline at User Device Example

Figure 6:
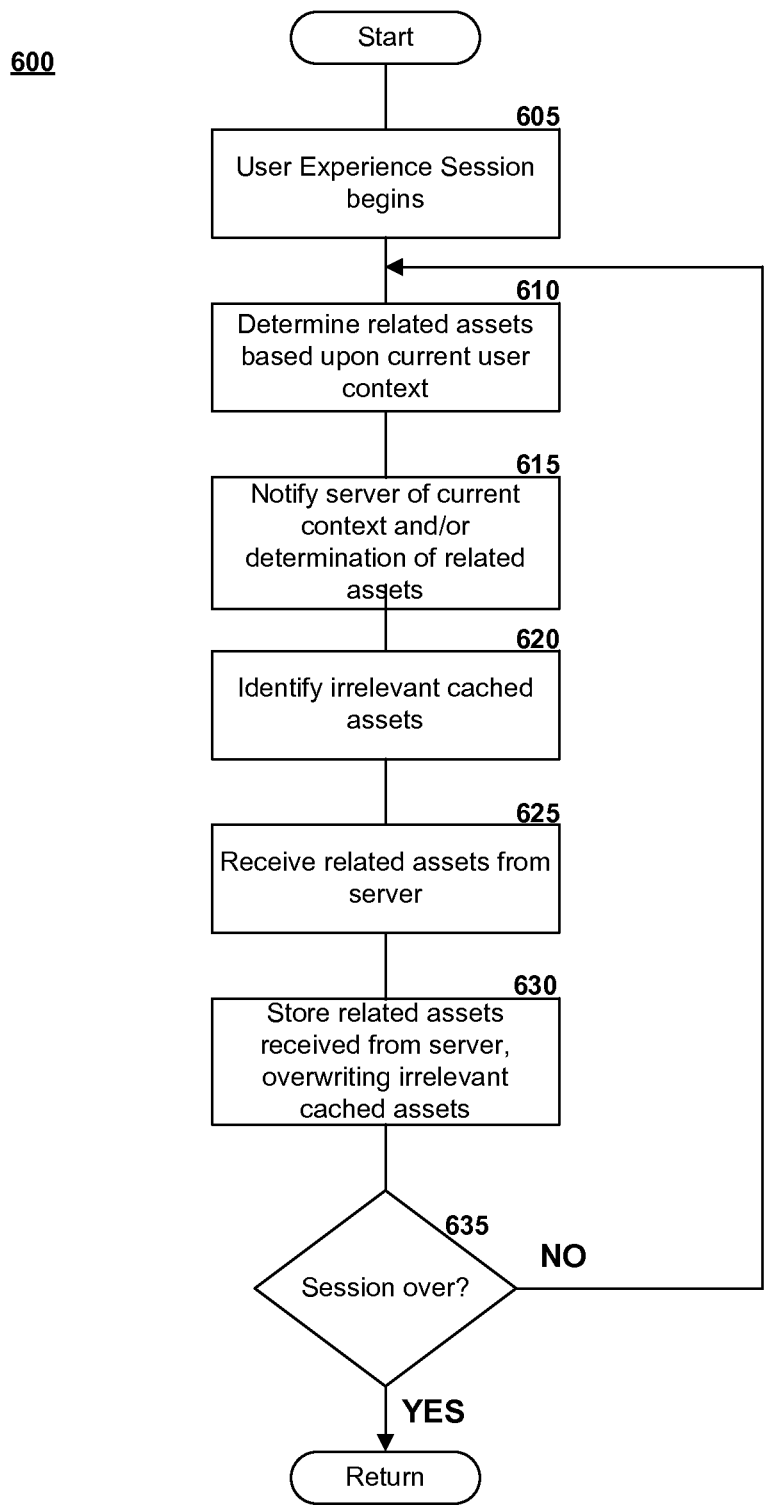
FIG. 6 is a flow diagram depicting a general process by which a user device may integrate assets pulled from a content server into an end-user experience as contemplated in some embodiments.

FIG. 6 is a flow diagram depicting a general process 600 by which a user device integrates assets pulled from a content server into an end-user experience as contemplated in some embodiments. At block 605, a user session experience may begin. For example, the user may turn on their personal device and begin the local application.

At block 610, the user device may determine assets related to the current context presented to the user. For example, if the current context is an interactive "space adventure" wherein the user is located in a spaceship prior to exploring a planet, the current context may be the spaceship interior and related assets those assets necessary to depict the planet in the immediate vicinity of the spaceship.

At block 615, the user device may notify the server of the current context and/or a determination of any related assets. At block 620, the user device may identify irrelevant cached assets. For example, having entered the spaceship interior context of the "space adventure", assets cached from a previous "jungle adventure" experience may be unnecessary. New assets, e.g., related to new features in a trail, may be received from the server at block 625. The new assets may be stored at block 630, possibly overwriting the cached assets identified as irrelevant. At block 635, the system may determine if the session is over (e.g., the user closes the application). If the session is not over, the system may return to block 610 and continue to assess the relevancy and irrelevancy of local assets. One will readily recognize that the steps are depicted here for explanatory purposes and not necessarily in the order they may occur on the user device.

Multi-Level Resolution—Trails

Figure 7:
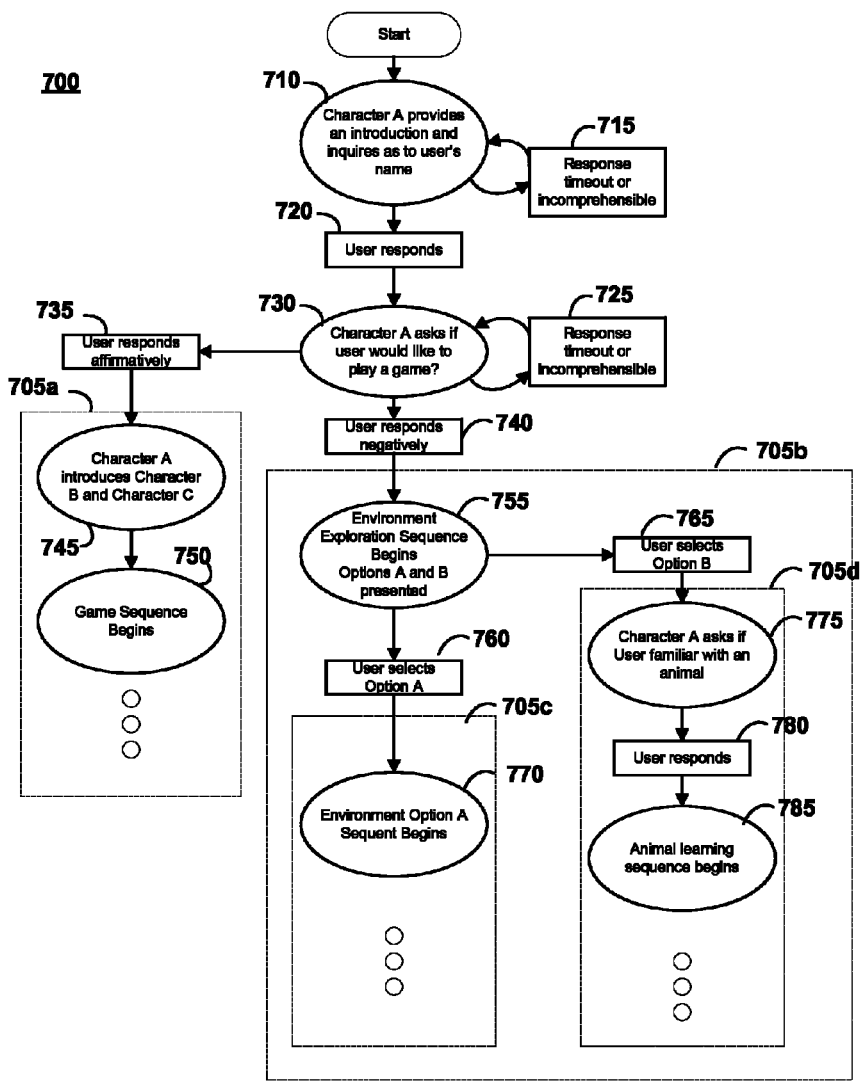
FIG. 7 is an example trail flow depicting various sub-trails and interactions a user may pursue in some embodiments.

FIG. 7 is a block diagram is an example trail flow 700 depicting various sub-trails and interactions a user may pursue in some embodiments. Trails reflect different paths a user may pursue as part of an interactive experience. A trail flow 700 may include metadata reflecting the possible trails a user may take within or between contexts, and the assets associated with each choice. Thus, the trail flow 700 may resemble a state machine with metadata commenting upon the assets and transitions between states.

For example, in an initial situation 710, Character A may provide an introduction to the user and inquire as the user's name. If the user does not respond, or fails to respond in an allotted time specified in the metadata 715, the system may pose the question in situation 710 again. When the user responds 720 the system may transition to situation 730. Again, following a timeout or inarticulate response, the system may again pose a question of situation 730. Situations 710 and 730 may share many of the same assets, e.g., the vertex mesh for Character A, textures for Character A, background images, local trail metadata, etc. Accordingly, the metadata may indicate that situations 710 and 730 are part of a same trail and the common assets should be together updated and removed as the situation demands.

However, an affirmative 735 or a negative response 740 from the user may result in a transition to a new trail 705a or new trail 705b. These trails may be very different from the current trail, having different assets, different metadata, etc. For example, trail 705a will result in the introduction of two new characters at situation 745 and the beginning of a game sequence 750. The game sequence 750 may require considerable logic and internal assets that are irrelevant to the current trail and the trail 705b. The trail 705b may itself have the potential to lead to two other trails 705c and 705d depending on which option 760, 765 the user selects from situation 755. Trail 705c may encompass assets relevant to an environment exploration sequence 770 and trail 705d may have assets concerning an animal education experience 775, 780, 785.

Accordingly the metadata for situation 730 may indicate the potential for considerable asset updates in the future. This metadata may cause the system to preemptively consider what assets are in its local cache and what should be preemptively acquired. Probabilities associated with past choices of the user, or the choices of other users may be included in the metadata to inform the choice. Depending on the available bandwidth and computational resources once the transition to situation 730 occurs the system may download assets from one or more of trails 705a-d. For example, during low bandwidth conditions, the system may seek to acquire only a handful of low resolution assets expected to be first encountered for trails 705a and 705b. In contrast, during high bandwidth conditions, most or all of high resolution assets for each of trails 705a-d may be acquired preemptively.

Figure 8:
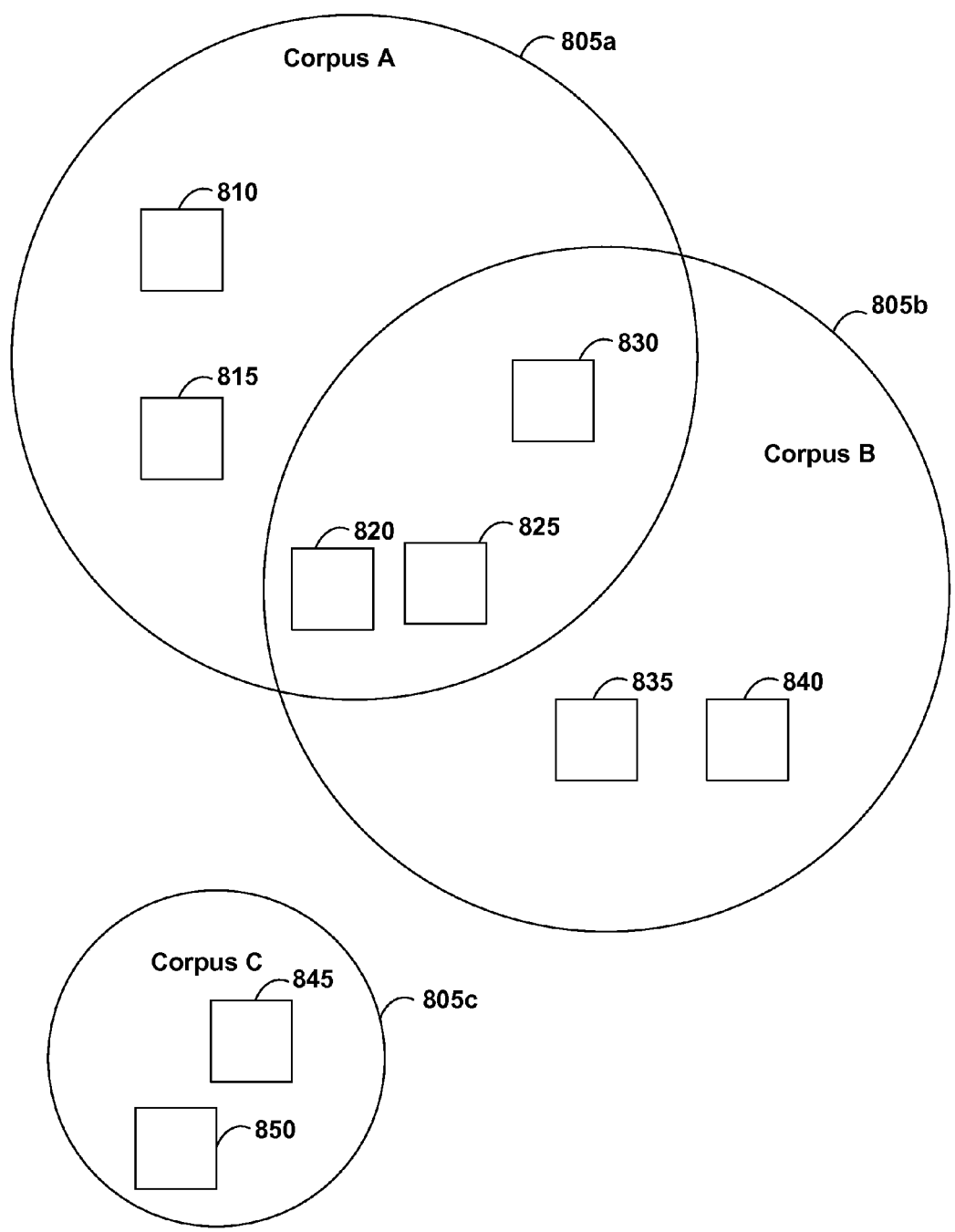
FIG. 8 is a set diagram depicting an example collection of relationships between assets as may occur in some embodiments.

FIG. 8 is a set diagram depicting an example collection of relationships between assets as may occur in some embodiments. These relationships may be specified in the trail metadata. For example, asset corpus A 805a, may include the assets 810-830. Asset corpus B 805b may include assets 820-840, sharing assets 820-830 with asset corpus A. The corpuses may be determined based on their relevance for various trails. For example, both trails 705a and 705d involved interaction with Character A. Accordingly, assets 820-830 may correspond to Character A assets used in both trails 705a and 705d. The user device may prioritize downloading both corpuses A-B where the overlap is expected. In contrast the assets 845-850 of corpus C 805c are not shared with other corpuses. For example, the assets 845-850 may relate to the game sequence 750 and have little relation to other aspects of the experience.

In addition to selecting which assets to download, the user device may also determine what level of fidelity to acquire. For example, a corpus may include multiple versions of an asset, each version providing more or less fidelity to facilitate transfer. Where an asset recurs between corpuses and will be frequently experienced by a user, it may be more highly prioritized by the user device and a higher fidelity version acquired. Conversely, a waveform asset relevant for a single inquiry that is unlikely to occur again may be lowly prioritized, and only a low quality version retrieved.

Figure 9:
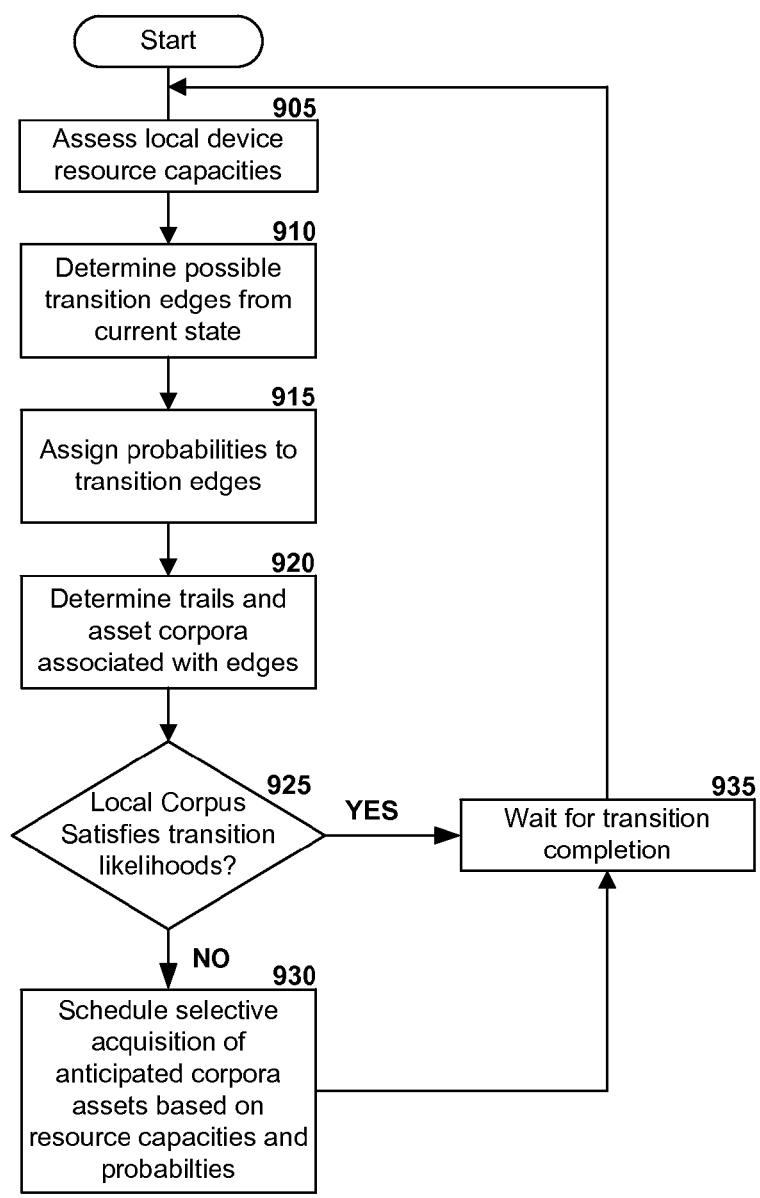
FIG. 9 is a flow diagram depicting an asset update process at a user device as may occur in some embodiments.

FIG. 9 is a flow diagram depicting an asset update process at a user device as may occur in some embodiments. At block 905, the server or user device may assess the user devices' resource capacities, e.g., available memory, bandwidth, processing speed, etc. At block 910, the server or user device may determine transition probabilities for edges from the current state in a trail. For example, the user device may consult metadata indicating a past preference by the user or other users for selecting one trail over another from the present state. At block 915, probabilities may be assigned to the edges (in some embodiments, the probabilities may have been previously determined and may be here acquired from a table, e.g., a SQL database). The probabilities may also be updated to reflect the time required to collect the assets to be used at the destination (e.g. as determined at block 920). For example, a destination with many assets may be weighted to receive a higher probability of transition in some embodiments to provide a more consistent user experience regardless of the path taken.

At block 920, the system may determine the trails and asset corpuses associated with the edges. This information may appear in the trail metadata.

At block 925, the system may determine if the locally cached assets satisfy the transition likelihoods. For example, the system may desire that the expected download requirements following user selection of a trail not exceed 500 MB of asset data. Accordingly, the following condition may be imposed (referred to as the "optimality condition") that there exist a collection of low and/or high fidelity assets "Assets_Absent$_n$" for each possible destination trail such that:

$$\exists \text{Assets\_Absent}_n \text{ s.t.} 500MB \geq \sum_{n=1}^{N} p_n * SizeOf(\text{Assets\_Absent}_n)$$

where $p_n$ is the probability of transitioning to trail n of the N possible destination trails, SizeOf measures the memory footprint of the assets, and Assets_Absent$_n$ reflects the assets absent from the user device's local cache. This condition may dictate, e.g., which assets are considered, the preemptive acquisition structure of the trails, and which assets are generated by content developers. The set of collections that may be considered, e.g., the number and character of assets which may be low or high fidelity, may be specified based upon the resource limitations of the user device, server bandwidth, user subscription level, etc. For example, a table may reflect the minimum fidelity permitted for each resource circumstance and/or user subscription. This table may be included in the trail metadata in some embodiments.

FIG. 10 is a block diagram depicting an asset hierarchy, e.g., for animations and audio materials, as contemplated in some embodiments. Particularly, in some embodiments, this hierarchy represents a dialog hierarchy, i.e., the hierarchy represents the structure and depth of a conversation. Users may always hit the very first line in a conversation but depending on where the conversation goes they are less likely to hit the deeper dialog lines in the conversation.

For example, an introductory animation 1005 may be presented to the user every time they being a trail. Depending upon the subsequent interaction, the user may then be presented with an animation 1010a, or an animation 1010b, etc. In response to the interaction associated with animation 1010a, the user may then be presented with an animation 1015a, 1015b, etc. Thus, with increasing depth in the animation tree a larger diversity of animations may be presented to the user.

This architecture may be used to prioritize asset (e.g., audio clip) creation, quality, encoding, etc. For example, the probability that a user will be presented with the introductory animation 1015a at depth 0 is 1. The probability that the user may be presented with the animation 1020a, however, may be much less than 1. Accordingly, fewer resources and production values may be addressed to the animation 1020a as compared to the introductory animation 1005 upon initial release. If subsequent feedback indicates that users regularly encounter the animation 1020a, then higher fidelity assets may be included on the cloud server and the trail metadata updated to reflect the availability and these higher fidelity assets and the increased likelihood they will be encountered.

Multi-Level Resolution—Animation

Figure 11:
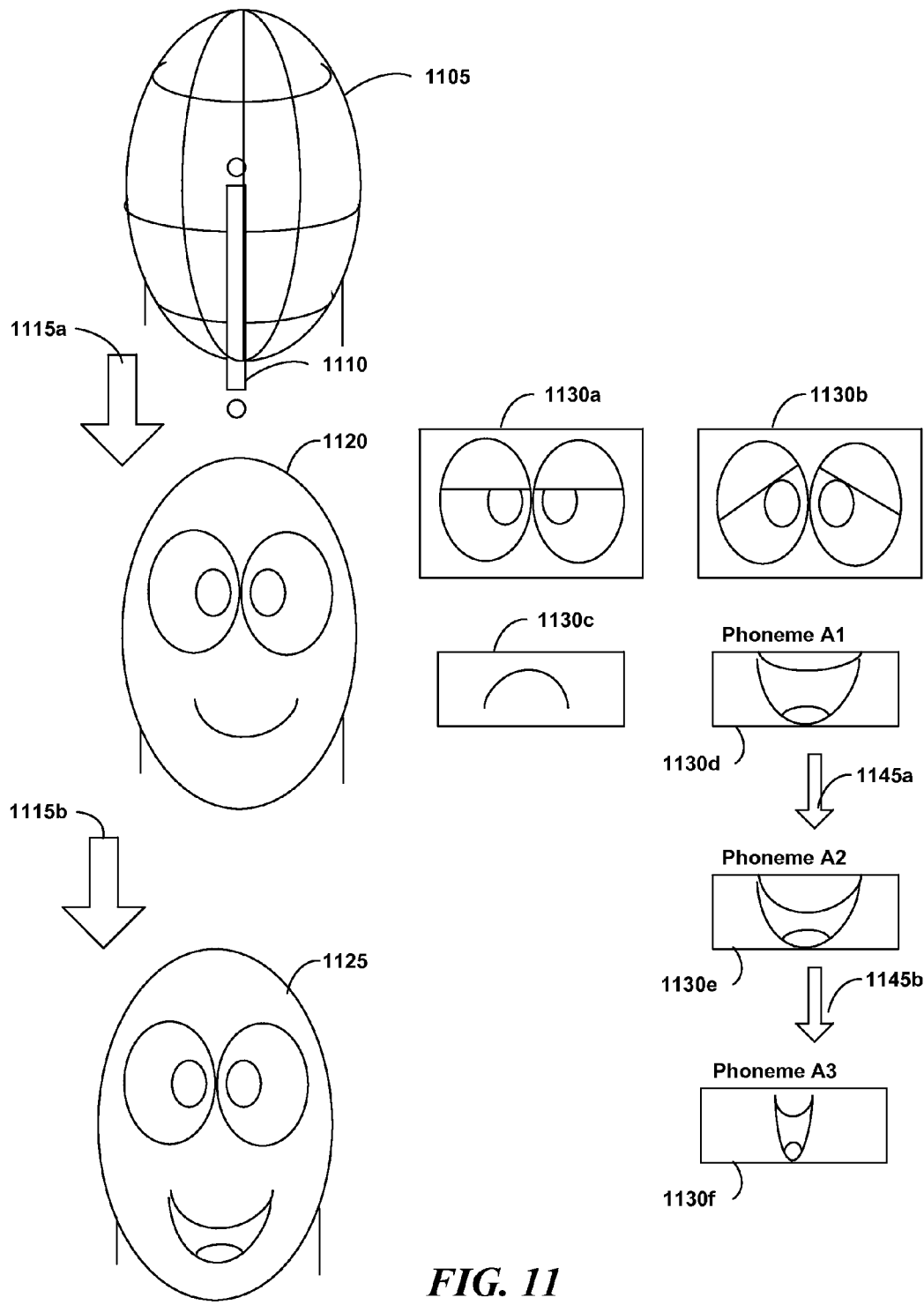
FIG. 11 is a block diagram indicating how three-dimensional meshes and two dimensional textures may be combined and interpolated to generate animation assets as may occur in some embodiments.

As discussed herein, different assets may be provided at the cloud server at different resolutions. For example, an animation asset may comprise many subassets such as skeletal animation keyframes, vertex meshes, texture images, etc. FIG. 11 is a block diagram indicating how three-dimensional meshes and two dimensional textures may be combined and interpolated to generate animation assets as may occur in some embodiments. A content creator may produce a 3D vertex mesh 1105 for a character and may associate various vertices with a skeleton 1110. Animation of the skeleton may accordingly result in movement of the vertices.

During rendering 1115a, a plurality of texture images 1130a,b, 1135a-f may be mapped to the vertices to create a rendered image 1120. Animation 1115b of the skeleton and/or textures may result in the perception of movement 1125 of the character. Certain textures 1130d-f may correspond to phonemes. For example, in English a finite set of phonemes may occur, each associated with a particular mouth position. By interpolating 1145a,b, e.g. performing an optical flow, between phoneme textures 1130d-f in time with a waveform, the system may give the impression of the character speaking the words heard by a user.

Figure 12:
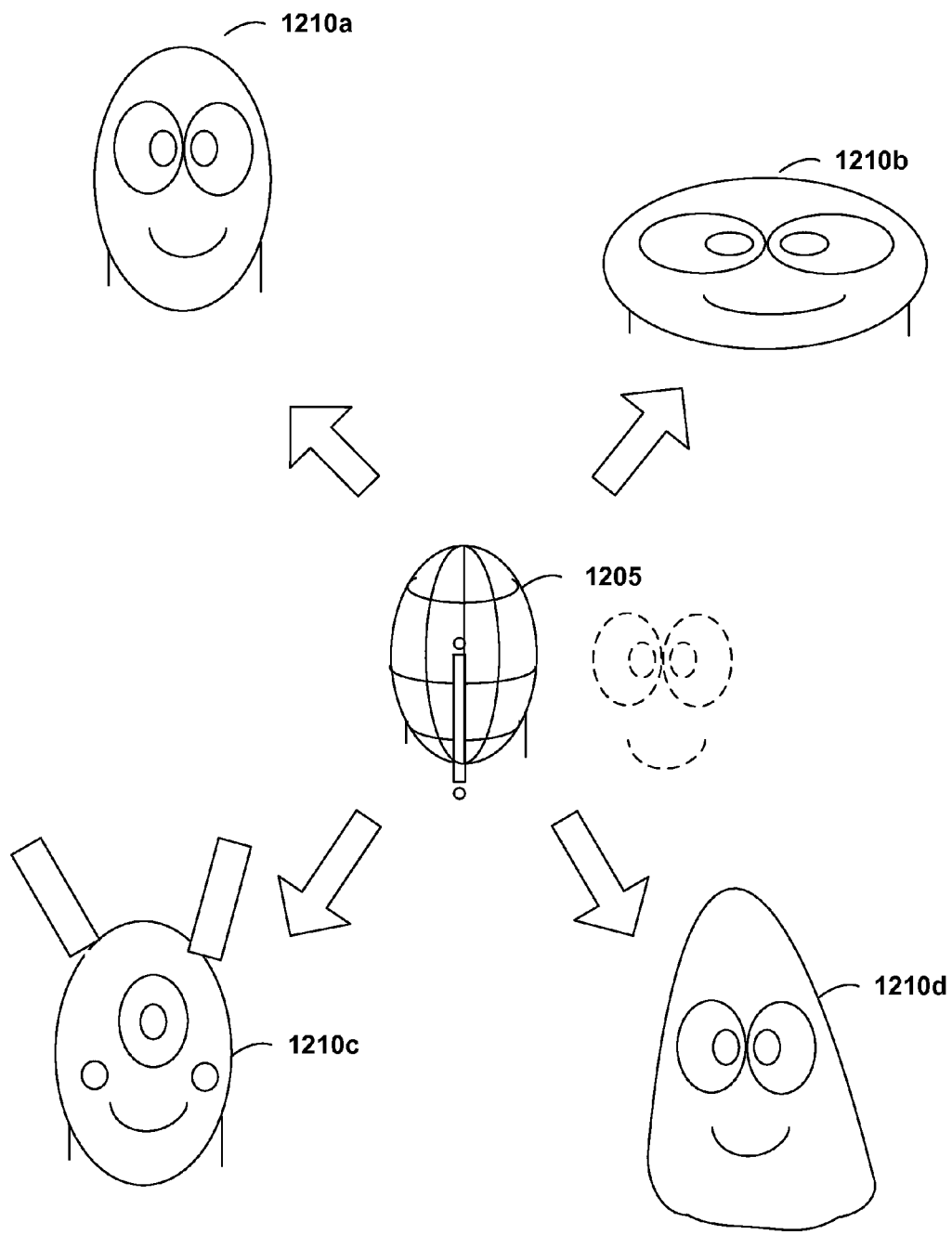
FIG. 12 is a block diagram indicating how retargeting may be performed between animation assets as contemplated in some embodiments.

FIG. 12 is a block diagram indicating how retargeting may be performed between animation assets as contemplated in some embodiments. To improve efficiency, a content creator may generate animation and phoneme textures for a single character 1205. The character 1205 may not be an actual character provided in the final content, but a neutral scaffold from which character data may be projected. Once the animation assets are generated for character 1205, the assets may be transformed to correspond to the vertex meshes and skeletons for each of characters 1210a-d.

Figure 13:
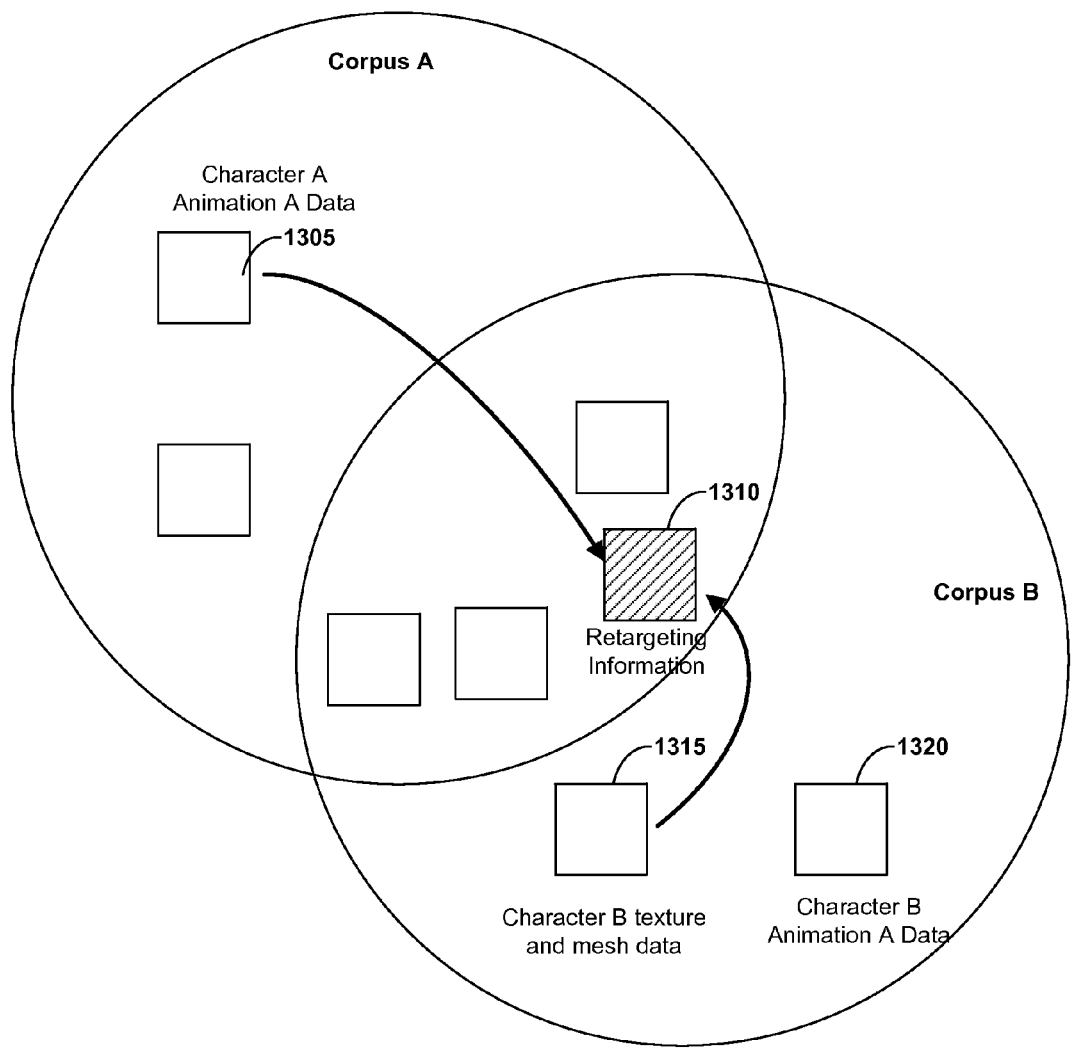
FIG. 13 is a set diagram depicting an example collection of relationships between assets following retargeting as may occur in some embodiments.

While retargeting may also be used to make asset creation more efficient, retargeting may also be used to consolidate asset corpuses in some embodiments. FIG. 13 is a set diagram depicting an example collection of relationships between assets following retargeting as may occur in some embodiments. Consider a situation where the user device has acquired Corpus A, which includes Animation A data for Character A 1305. During a subsequent trail transition, Character B may be introduced. Rather than download all the missing assets from Corpus B, the user device may instead selectively download only those assets of Corpus B, which in conjunction with Corpus A, suffice to perform the desired operations.

For example, the trail metadata may indicate that retargeting information 1310 exists, or may be dynamically generated, which may be used in conjunction with the Character A's Animation A data 1305 to recreate the Animation A data for Character B 1320 without downloading the Animation A data for Character B 1320. Instead, only the Character B vertex and texture information 1315 which cannot be derived from the current locally stored information may be retrieved. Strategically placing retargeting and interpolation information throughout the corpuses may greatly speed asset production on user devices. Such relationships may be specified in the content generation interfaces discussed elsewhere herein.

Figure 14:
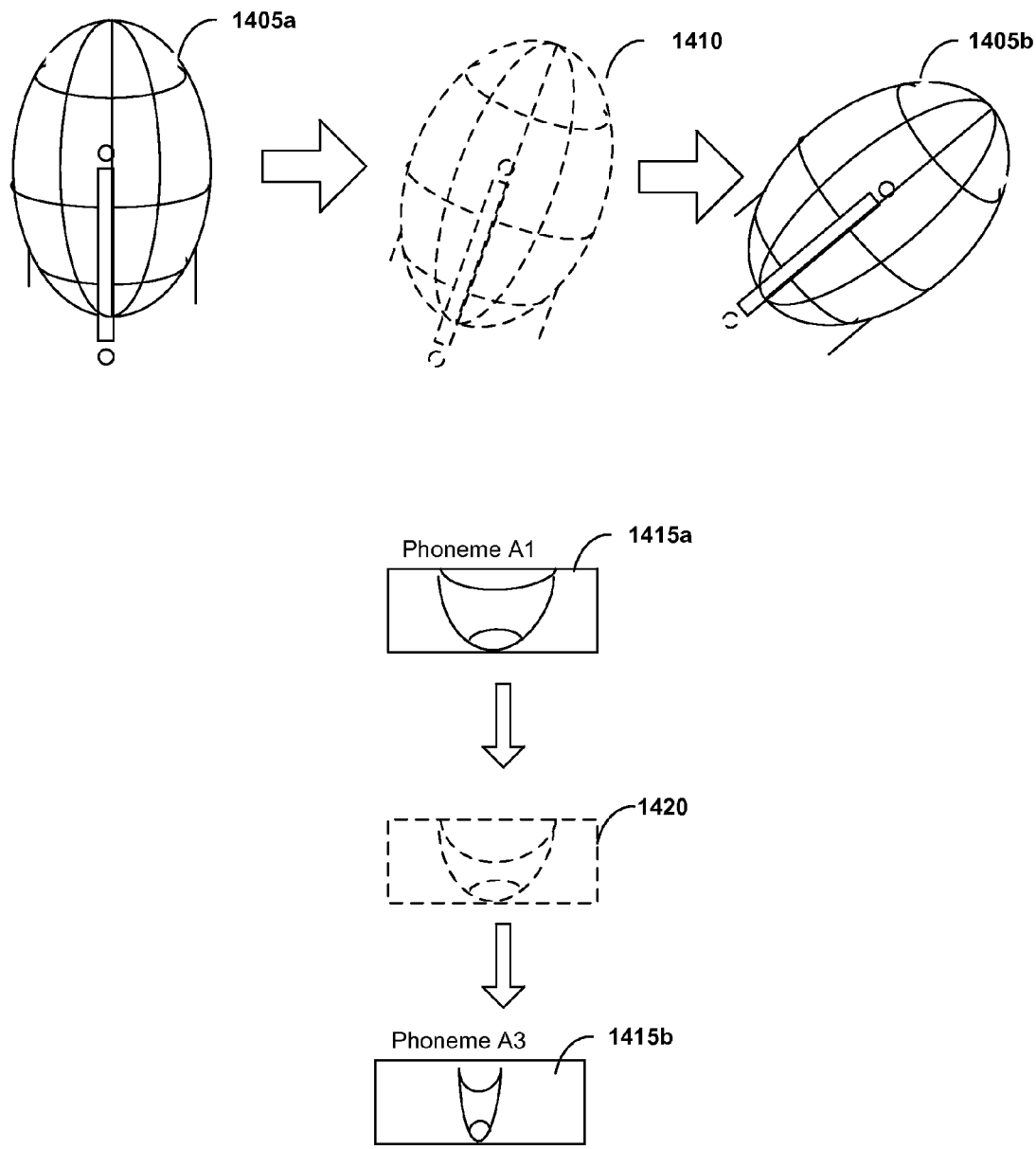
FIG. 14 is a block diagram indicating how interpolation may be performed between animation assets as contemplated in some embodiments.

FIG. 14 is a block diagram indicating how interpolation may be performed between animation assets as contemplated in some embodiments. In addition to adjusting asset fidelity by reducing the content of an asset (e.g., the number of vertices in a mesh, the compression of a texture or waveform), fidelity variation may also be achieved by varying the degree and character of interpolation between components. For example, keyframe skeletal orientations 1405a,b may serve as the basis for determining one or more interpolated 1410 position assets. Similarly, one or more keyframe phoneme textures 1415a,b may serve as the basis for generating one or more intermediate textures 1420.

Figure 15:
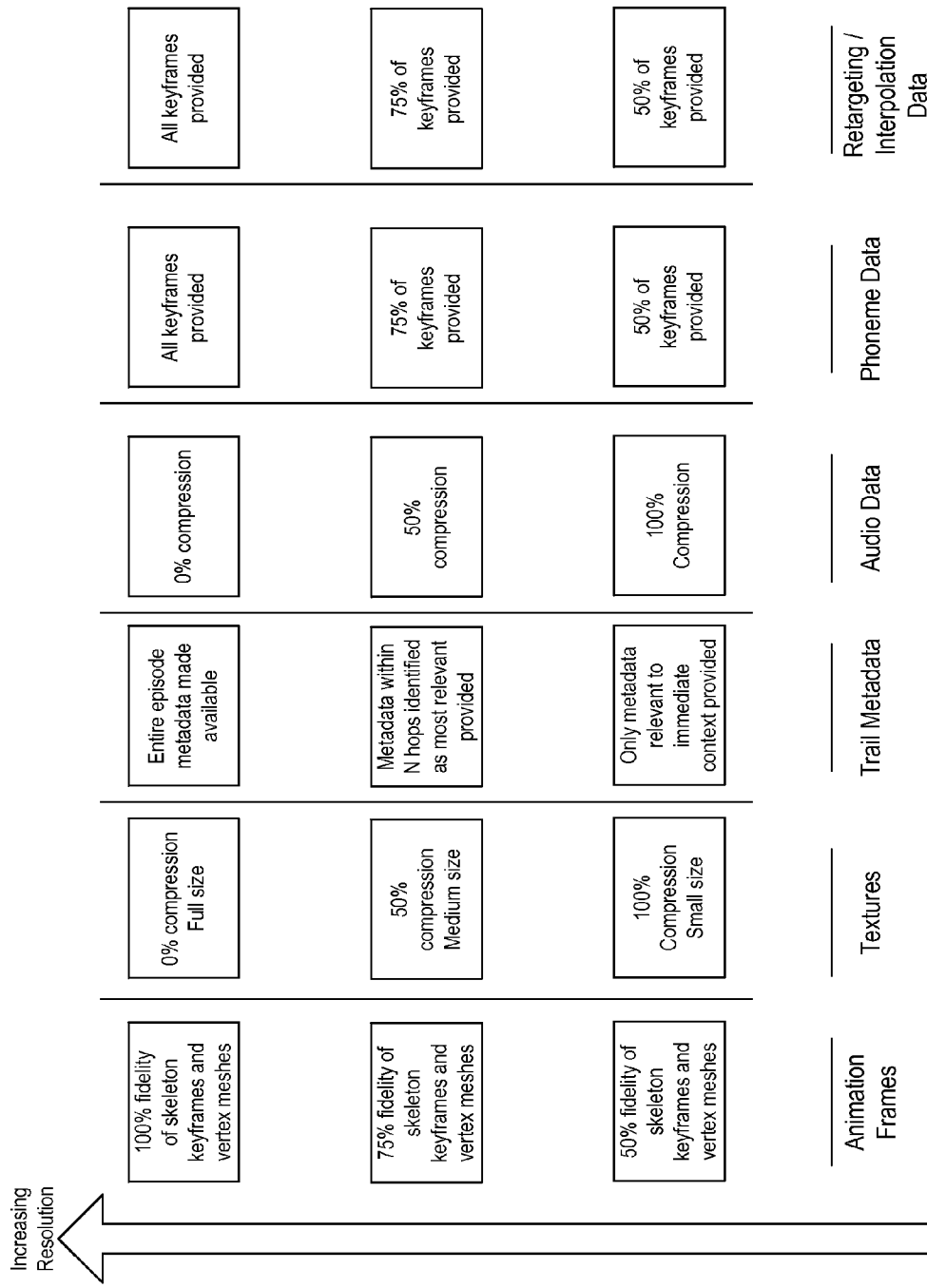
FIG. 15 is a block diagram depicting the relationships between various multi-resolution assets as may occur in some embodiments.

FIG. 15 is a block diagram depicting the relationships between various multi-resolution assets as may occur in some embodiments. As resolution/fidelity 1505 increases, different characters of assets may be provided. A low resolution animation frame may reflect only 50% of the skeletal keyframes and/or a model having 50% the vertices of a high resolution version. As resolution is increased, these animation assets may include additional keyframes and vertices.

Texture fidelity may be adjusted based upon compression and/or texture size. For example, a high fidelity texture may not be compressed and have dimensions 1024×1024 pixels. In contrast, a low fidelity texture may be completely compressed (e.g., using JPEG) and/or may have smaller dimensions, e.g., 128×128 pixels.

High fidelity trail metadata may include metadata for an entire episode of trails, with considerable detail regarding where and when to acquire assets, with extensive probabilistic assessments when they should be acquired. Conversely, low fidelity trail metadata may only include the necessary data to continue the experience in the immediate context.

Audio data fidelity may be adjusted as a factor of compression. Similarly, keyframe information in phoneme data may vary with the fidelity. Retargeting and interpolation data may also be adjusted in accordance with the fidelity.

Fidelity may also reflect an interplay between assets. For example, as fidelity decreases the trail metadata may not only change in quantity, but in character, where characters respond differently, e.g., using shorter waveforms that may be more easily compressed or reused.

Figure 16:
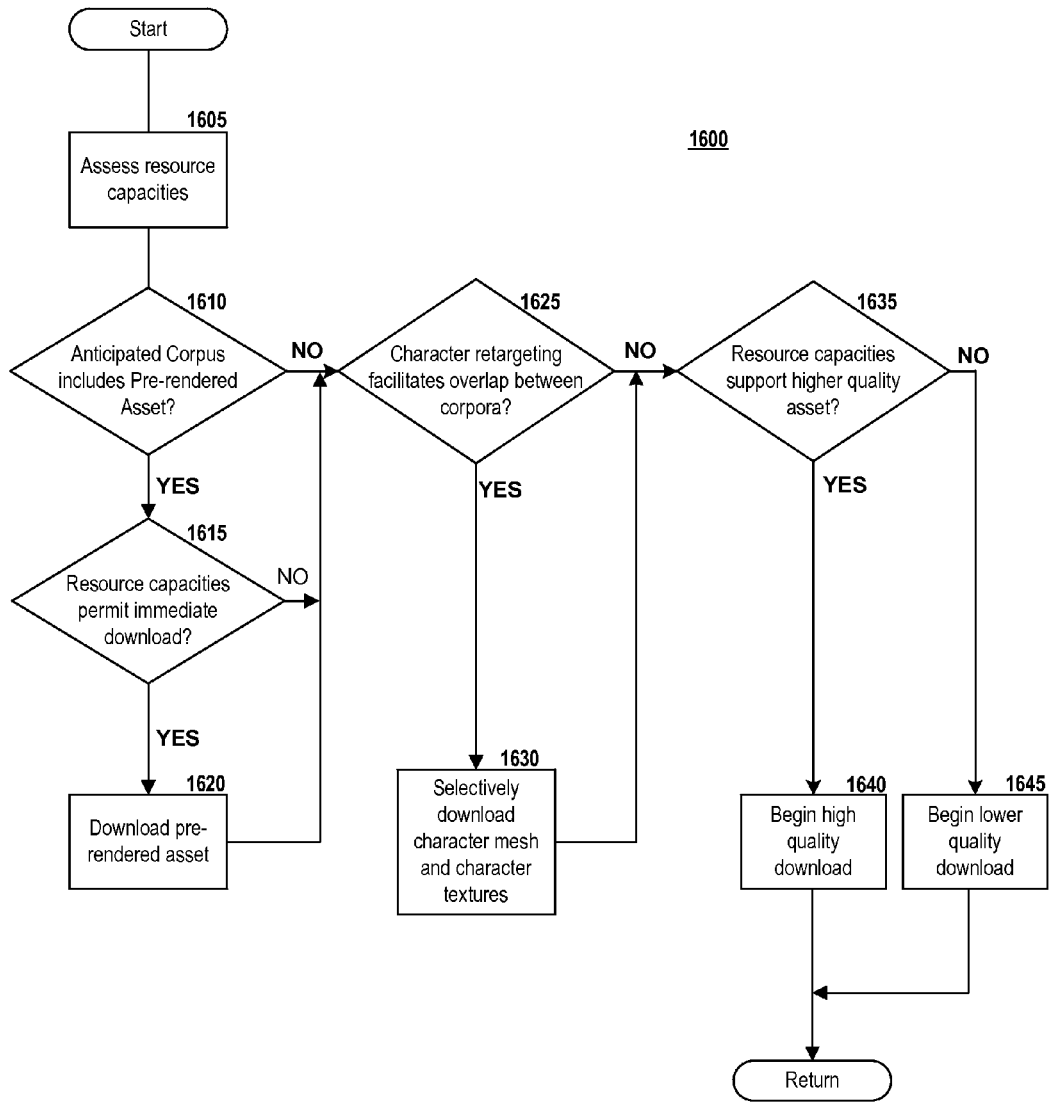
FIG. 16 is a flow diagram depicting a process to determine the appropriate asset fidelity as may occur in some embodiments.

FIG. 16 is a flow diagram depicting a process 1600 to determine the appropriate asset fidelity to acquire as may occur in some embodiments. At block 1605 the server or user device may assess the available resource capacities (e.g., local memory, network bandwidth, etc.). At block 1610, the system may determine if the anticipated corpus includes a pre-rendered asset (e.g., a video of an animal running as part of an education lesson). For those corpuses including a pre-rendered asset, the system may determine if the resource capacities permit immediate download at block 1615. If so, the pre-rendered asset may be downloaded immediately. Otherwise the download may be deferred until a more optimal time (in the worst case, when the pre-rendered asset is to be displayed). At block 1625 the system may determine if character retargeting may facilitate a reuse of other corpus assets. If so, at block 1630, the system may selectively download character meshes, textures, and/or other assets that can be used in conjunction with the retargeting to more efficiently generate the corresponding assets.

Finally, at block 1635, the system may determine if the resource capacities support acquisition of a higher quality asset. If so, at block 1640, a higher quality download of the remaining corpus assets may begin. Otherwise, at block 1645 the system may begin a lower quality download of the remaining corpus assets.

Multi-Level Resolution—Audio

Figure 17:
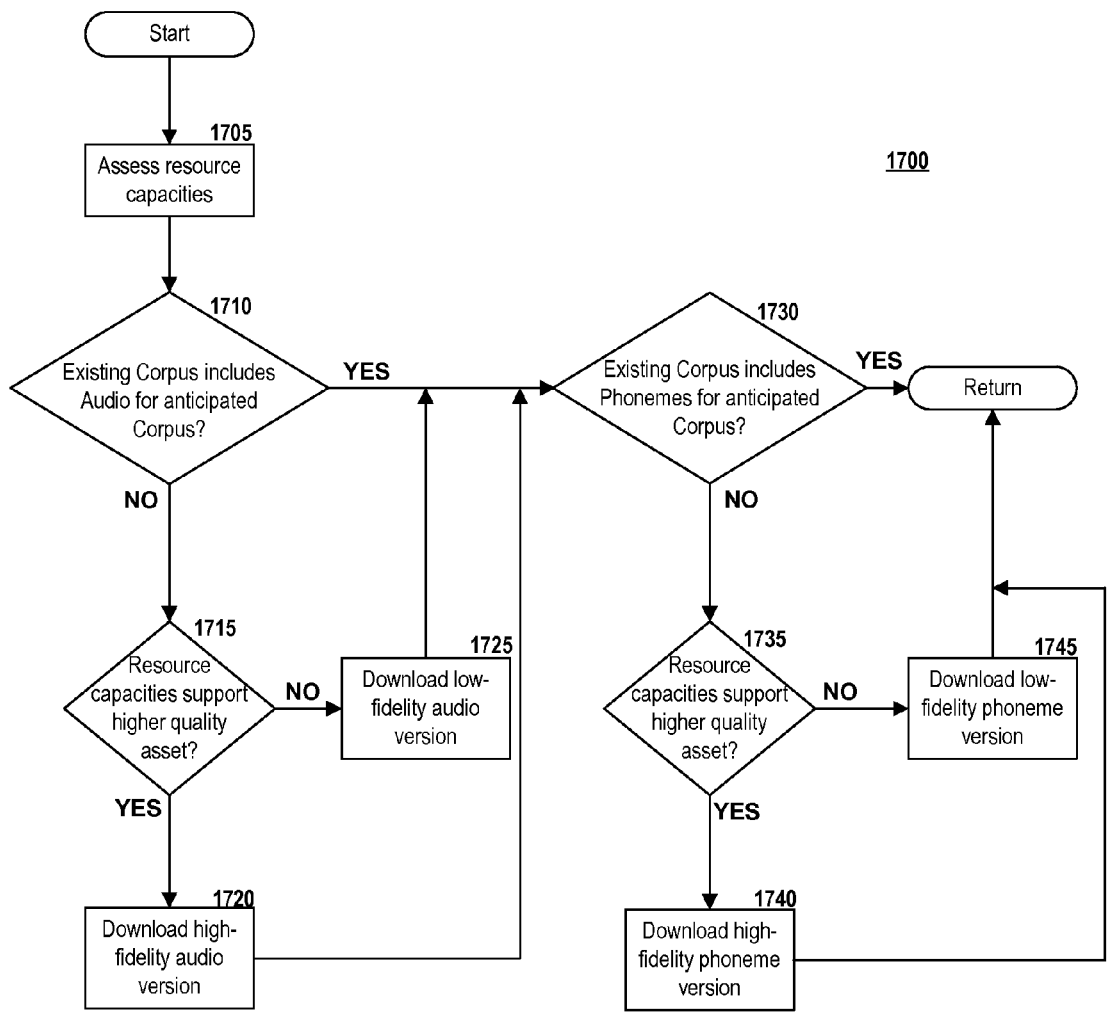
FIG. 17 is a flow diagram depicting a process to update and prepare multi-resolution audio assets as may occur in some embodiments.

FIG. 17 is a flow diagram depicting a process 1700 to update and prepare multi-resolution audio assets as may occur in some embodiments. At block 1705 the server and/or user device may assess resource capacities. At block 1710 the system may determine if the locally cached corpuses share audio clips for the anticipated corpus. At block 1715 the system may determine if the resource capacities support higher quality assets. If so, the high quality audio may be downloaded 1720, and the low quality audio if not 1725.

Similarly, the system may determine if the locally cached corpuses share phonemes with the anticipated corpus. If not, the system may determine if the resource capacities support the high quality assets at block 1735. If so, the high quality phoneme data may be downloaded 1740, and the low quality phoneme data if not 1745.

Multi-Level Resolution—Tagging

Figure 18:
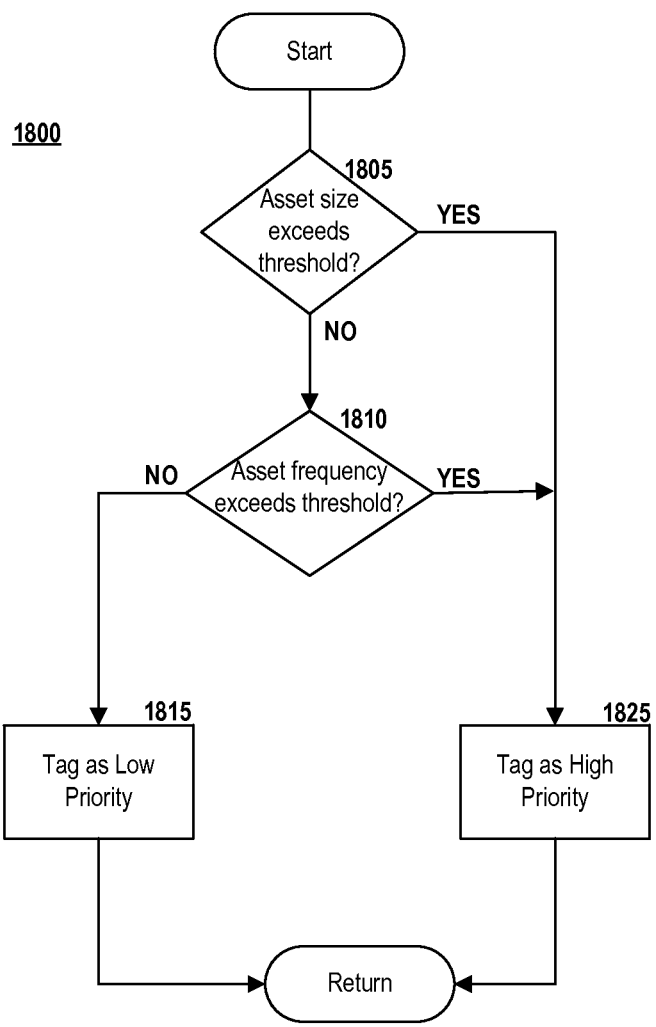
FIG. 18 is a flow diagram depicting a process to tag multi-resolution assets as may occur in some embodiments.

FIG. 18 is a block diagram depicting a process 1800 to tag multi-resolution assets as may occur in some embodiments. At block 1805, the system may determine if the asset size exceeds a threshold. The threshold may be based on the character of the assets and upon the "optimality condition". For example, a greedy approach may be pursued, wherein each asset size is conditioned to be a minimum to satisfy the "optimality condition". If the asset exceeds the size, it may tagged as a high priority asset at block 1825. A high priority indication may indicate that download of the asset should be preemptively performed in advance of lower prioritized assets, e.g., because it will take longer to acquire. Similarly, higher fidelities may be preferred to assets tagged with higher priorities.

At block 1810, the system may consider if the asset is a "high frequency" asset. For example, a character mesh will likely be encountered every time a character appears on-screen. Similarly, a background image during an introductory screen may appear every time the user initializes the interaction. Because these assets are so frequently encountered by the user (and likely subject to closer inspection as a consequence) they may be accorded a higher priority at block 1825. Where an asset is both large and frequently encountered, it may receive an especially large priority. Alternatively, smaller or less frequently encountered assets may be less prioritized 1815.

Animation Creation and Tagging

Figure 19:
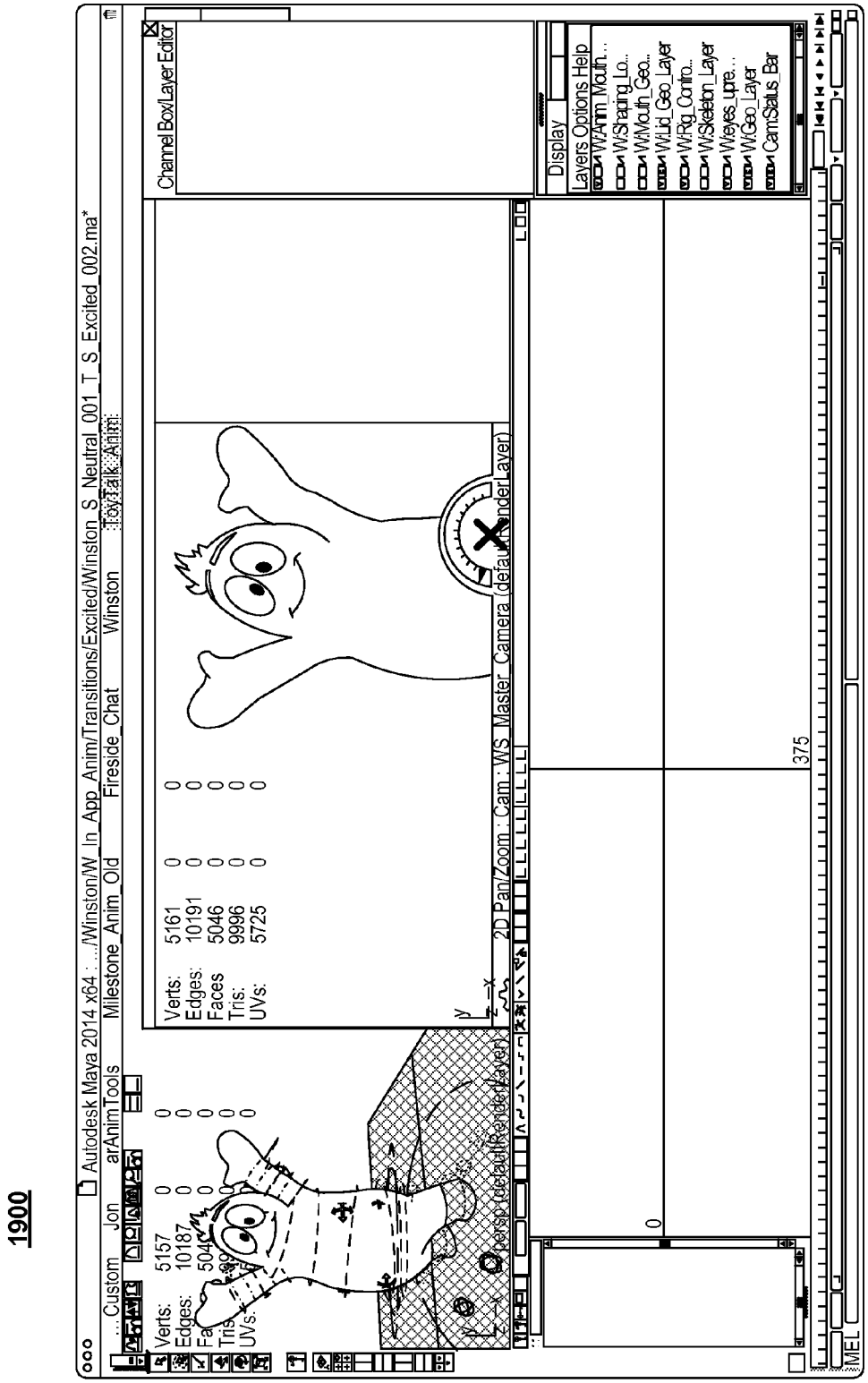
FIG. 19 is a screen shot of an exultation animation in a development environment, e.g. Maya®, for creating animation assets as may be used in some embodiments.

FIG. 19 is a screen shot of an exultation animation in a development environment, e.g. Maya®, for creating animation assets as may be used in some embodiments.

Figure 20:
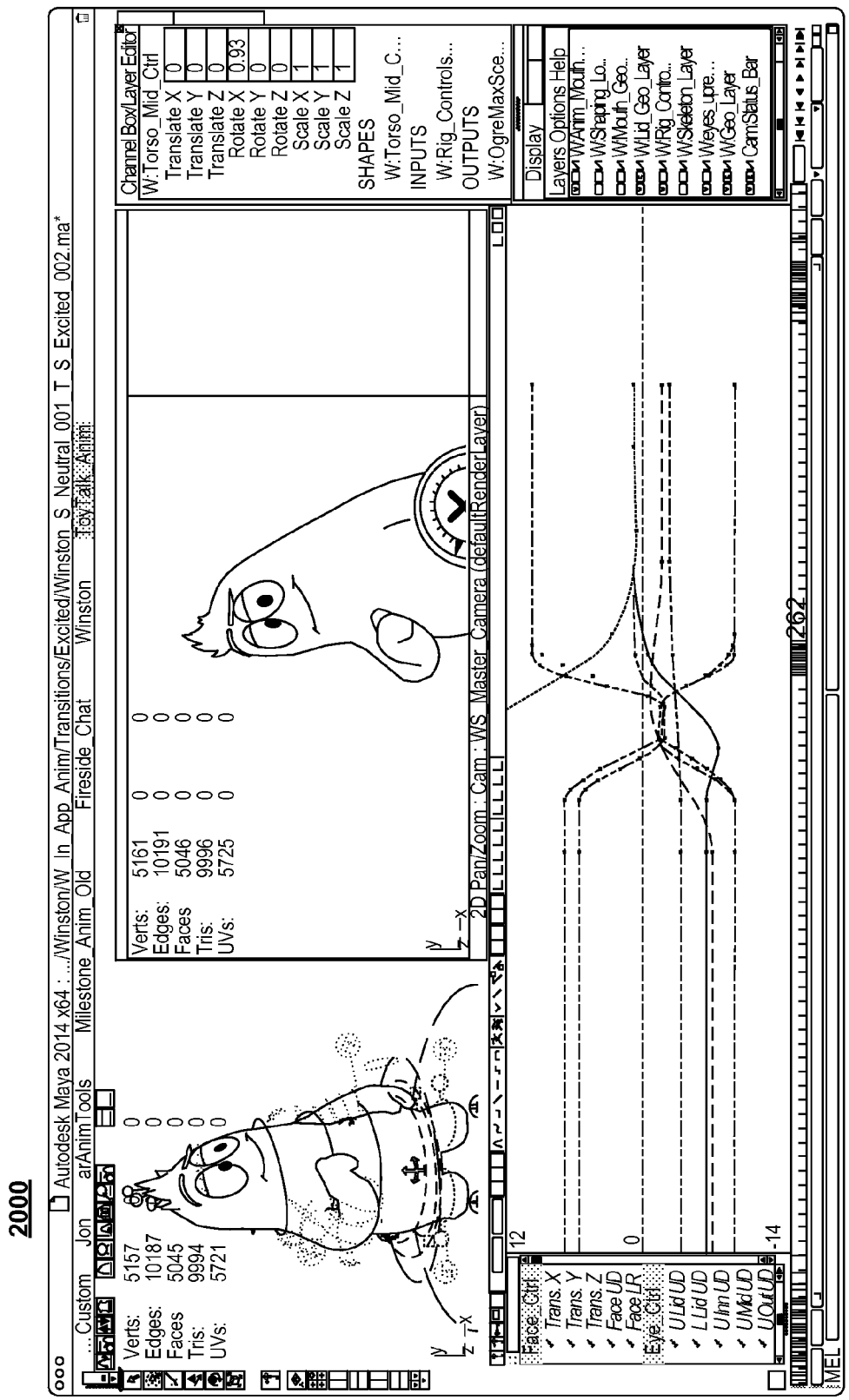
FIG. 20 is a screen shot of a query animation, including keyframes, in a development environment, e.g. Maya®, for creating animation assets as may be used in some embodiments.

FIG. 20 is a screen shot of a query animation, including keyframes, in a development environment, e.g. Maya®, for creating animation assets as may be used in some embodiments. As indicated a plurality of keyframes have been designated to coordinate movement of various parts of the character model. Though 3D characters are depicted in this example, 2D characters may be created in some embodiments instead.

Figure 21:
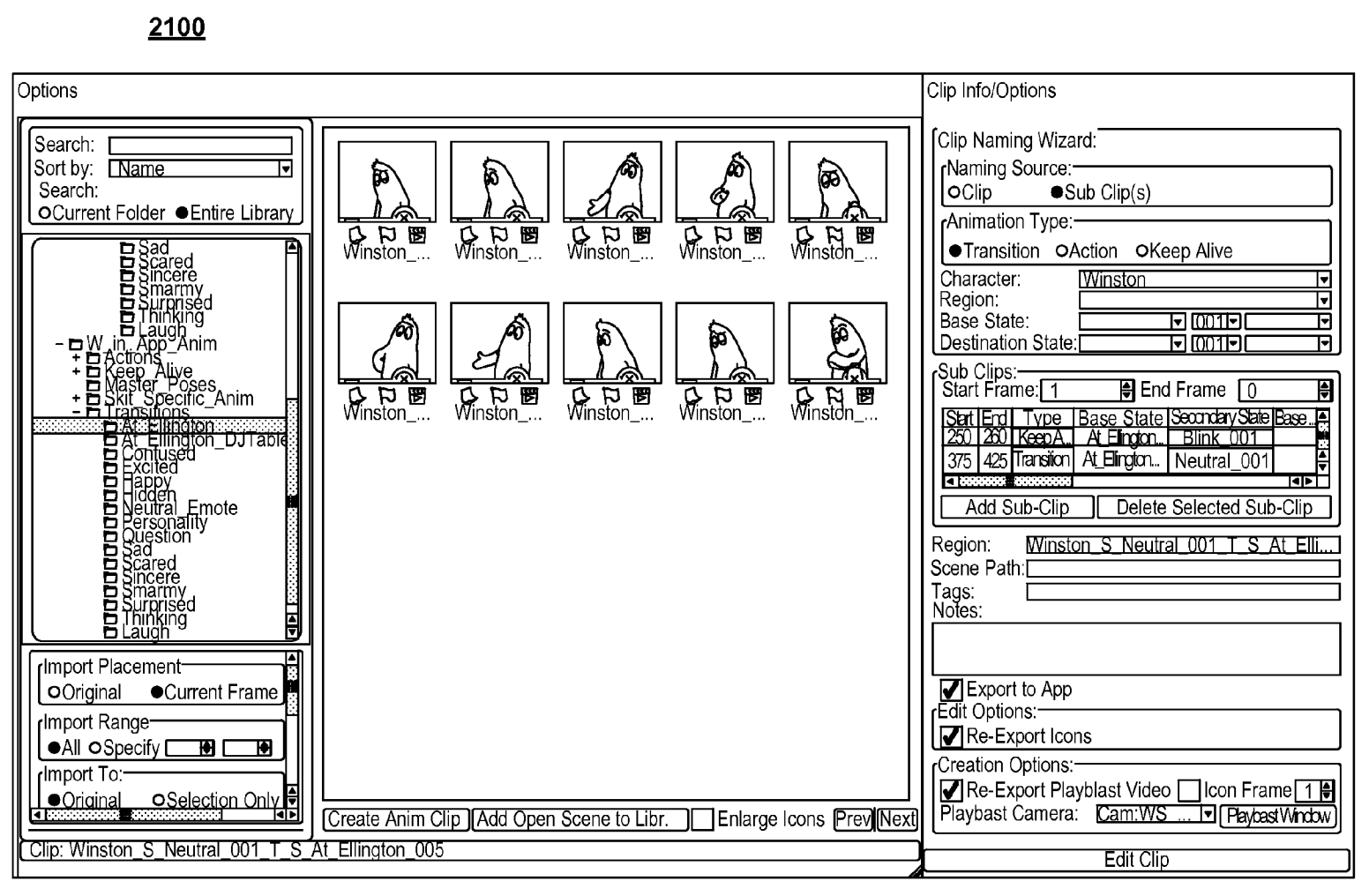

FIG. 21 is a "Pose Library" interface created inside of a development environment, e.g. Maya®, to define which clips will appear in a user device as may be used in some embodiments.

Figure 22:
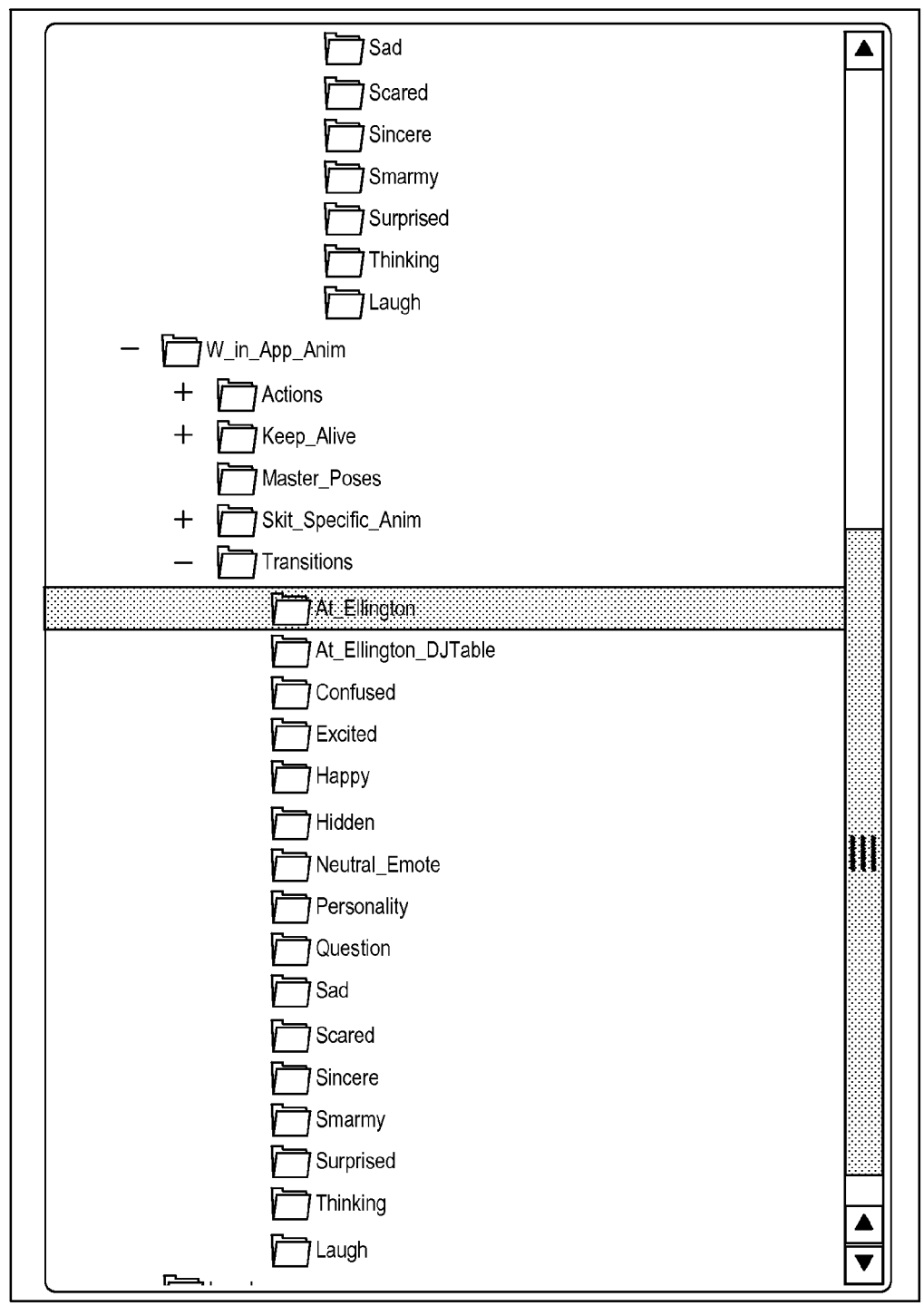
FIG. 22 is an enlarged view of the animation selections in the example "Pose Library" of FIG. 21.

FIG. 22 is an enlarged view of the animation selections in the example "Pose Library" of FIG. 21. In some embodiments, the pose library is used to allow animators to organize the clips that will appear on the user's device and to differentiate between live clips and in-development clips.

Figure 23:
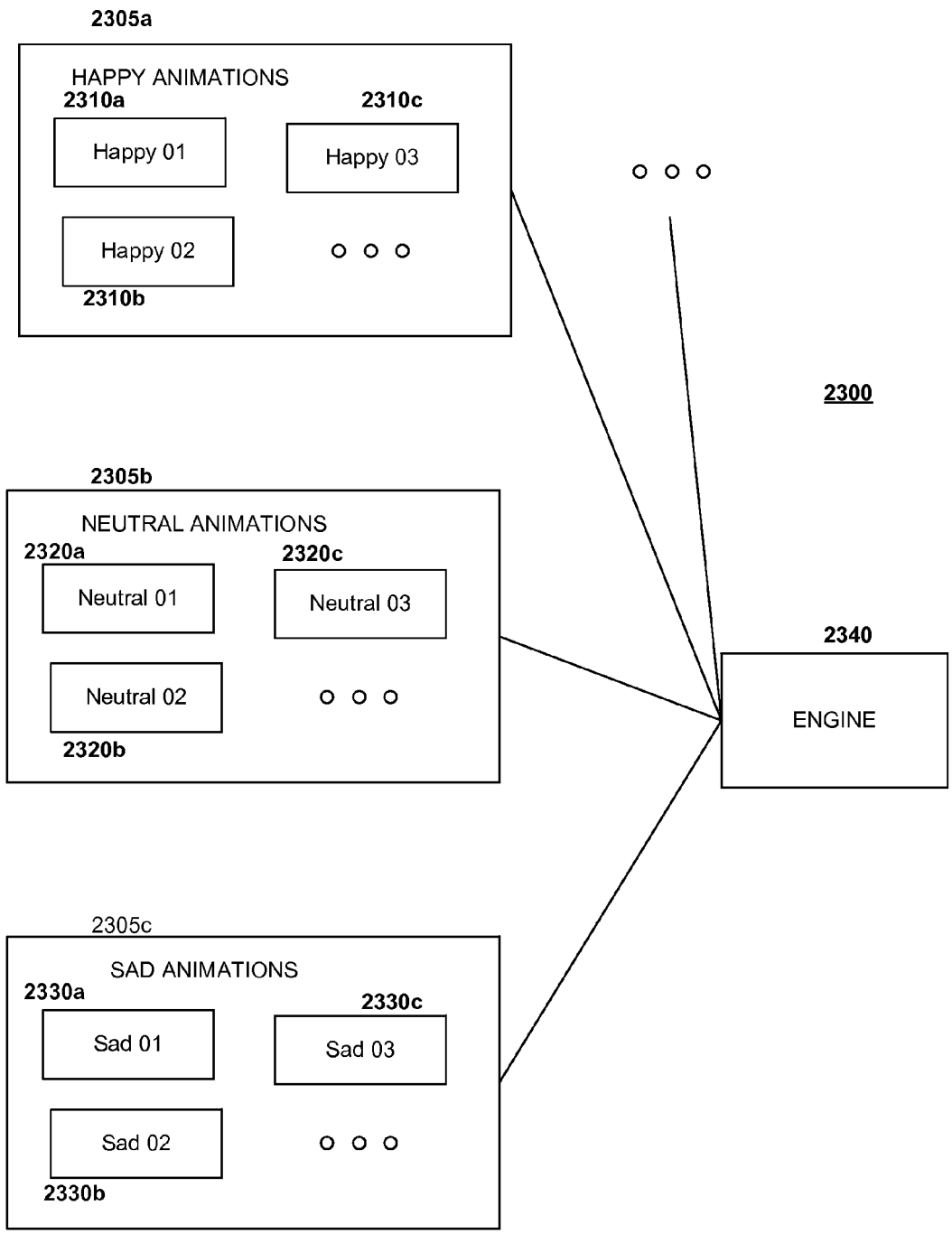
FIG. 23 is a block diagram depicting the relationships between various animation and asset groups and an engine as contemplated in some embodiments

FIG. 23 is a block diagram depicting the relationships 2300 between various animation and asset groups and an engine as contemplated in some embodiments. For example, a plurality of "Happy" animations 2305a may be created, a plurality of "Neutral" animations 2305b, a plurality of sad animations 2305c, etc. organized into groups (e.g., for storage in the corpus and for interpolation/retargeting determinations). An engine 2340 may interpret a script requesting use of an asset from each category. The engine may select assets from within a category, e.g. randomly, so as to produce a more organic performance by the character. Engine 2340 may, e.g., generate bucket lists and tagging information used to populate the interfaces of FIGS. 28 and 29 and may be used to produce the transition diagram in FIG. 25. All or a portion of the engine 2340 may reside on the user device and be used to select one or more suitable animations, while in some embodiments the engine 2340 resides at the server or with the content creator.

For example, an animator may specify in metadata that an individual animation (e.g., a character speaking with a happy expression, "Happy_01" 2310a) is to be played by the engine 2340 at a moment in a trail. Alternatively, the animator may specify in metadata that the engine 2340 may select any of a class 2305a of "Happy" animations to be selected, e.g., Happy 01, Happy 02, Happy 03, etc. For example, the engine may attempt to pick an animation clip that the user has not seen before. This delegated approach lets the animator provide a coarse metadata tag of the emotion of the character, while letting the engine choose the best specific animation clip to play.

FIG. 24 is an interface to manage animation clips as implemented in some embodiments. The interface lets the animator play animation clips, review metadata, and flag the clip for sending to a user's device.

Animation Creation and Tagging—State Machine

Figure 25:
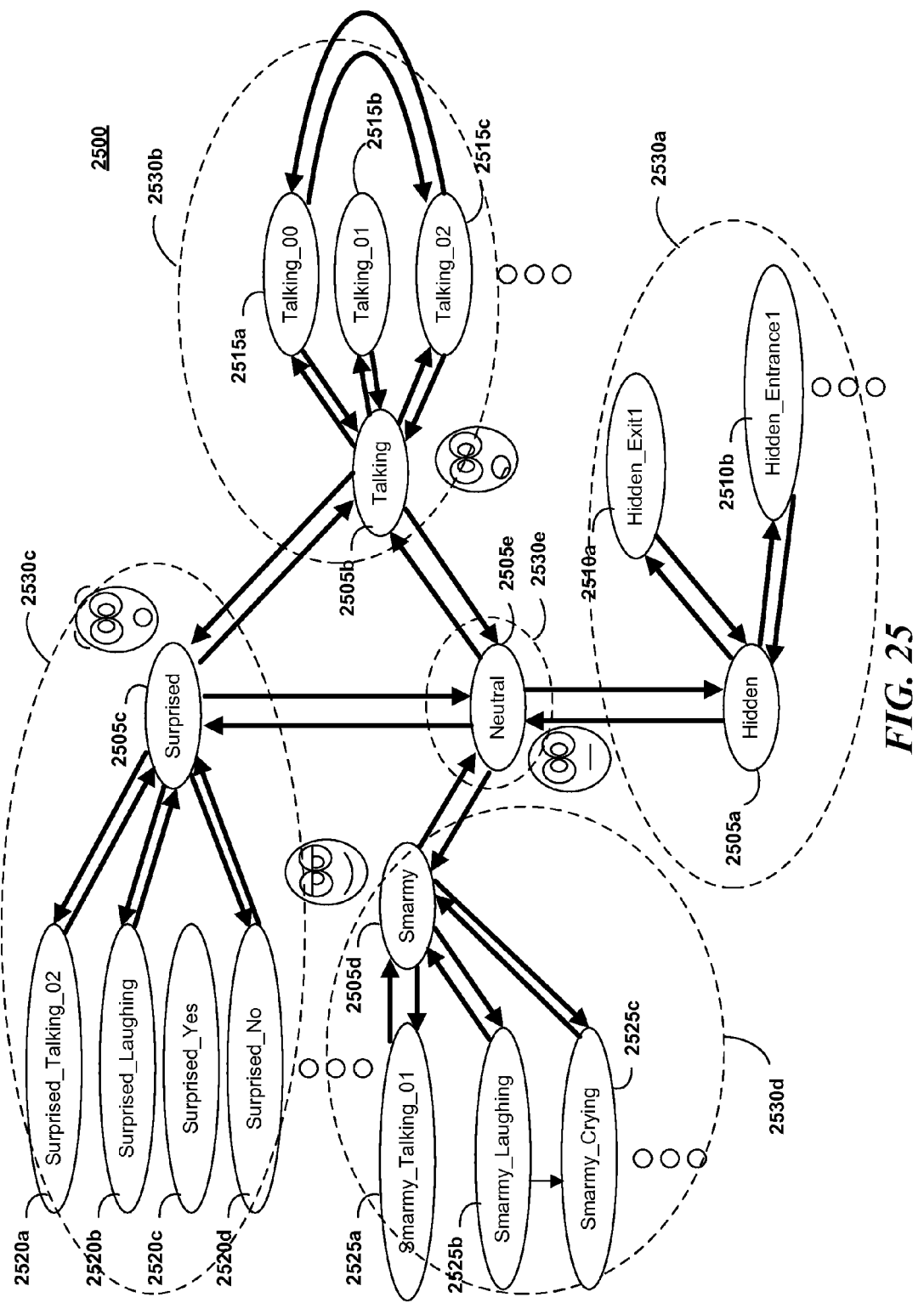
FIG. 25 is an example state machine depicting transmissions permitted between character animation keyframes as may occur in some embodiments.

FIG. 25 is an example state machine 2500 depicting transmissions permitted between character animation keyframes as may occur in some embodiments. As discussed above, an animator may have created a handful of animations. The system may then identify animations which are sufficiently similar that they may be transitioned to one another smoothly. Where two animations have start and end keyframes that are so disparate a smooth transition between them cannot be effected as desired, the system may identify an "intermediate" keyframe animation and use it to effect the transition. The "distance" or "disparity" between keyframes may be measured as a summation of the Euclidean distance between common vertex in the different keyframe meshes, variations of a Procrustes analysis between the vertex meshes of the keyframes, an optical flow distance between textures, etc.

Individual animations may be generally organized into groups 2530a-e. For example, there may be groups depicting various emotional interactions such as a "surprised" group including animations depicting surprise and a "smarmy" group including animations depicting the character with a smarmy expression. A neutral group 2530e may include several neutral expression animations. Each of the groups may have a "base" expression 2505a-e from which other expressions, e.g., 2520a-d, may be reached. Though only a single "base" animation 2505e is depicted in the neutral 2530e group in this example (which may consist of a single keyframe in a static, neutral position), in many embodiments the groups may share many common animations reflecting, e.g., a single action but performed with each groups' different expression. Thus, there may be a "laughing" animation 2520b, 2525b in each of the groups (though one is not depicted in this example for the neutral group 2530e). The animations in each group may include two-dimensional textures and/or three dimensional meshes. The "states" in the diagram may reflect a single key frame, or multiple key frames. Accordingly, where multiple keyframes are considered, the transition may reflect the relation between the last keyframe of the source and the first keyframe of the destination (e.g., the transition from Talking_00 2515a to Talking_02 2515c may be permitted because of the similarity between the last keyframe of Talking_00 2515a and the first keyframe of Talking_02 2515c). Note that the reverse may not be true. For example, while the last keyframe of the source may resemble the first keyframe of the destination the last keyframe of the destination may not resemble the first keyframe of the source. Accordingly, in this example, the character may transition from Smarmy_Laughing 2525b to Smarmy_Crying 2525c but not the reverse. Again, note that the disparity between animations may be the disparity between keyframe vertex meshes and/or keyframe textures.

Groups not directly related to an emotional expression may also be present, e.g., the "talking" group 2530b and the "hidden" group 2530a. The "talking" group 2530b may include different phonetic elements (e.g., the phoneme components discussed herein) or animations corresponding to entire spoken sequences. The animations in "talking" group 2530b may not reflect a particular emotional expression. Animations in the "hidden" group 2530a may reflect transitions on and off screen. For example, animations may exist where a character walks into view 2510b or where the character 2510a exits. The hidden base state 2505a may be one of many hidden base states and/or in some embodiments the system may transition directly from the neutral base state 2505e to the different exit animations, e.g., 2510a. Conversely, entrance animations may transition to the neutral base state 2505e.

Where the character has just returned to the base expression for an emotion, e.g., Surprised 2505c after Surprised_Yes 2520c or Surprised_No 2520d and is to begin speaking, it may be undesirable to first transition to the base Talking state 2505b and to then transition, e.g., to the Talking_02 2515c animation. This may be particularly true if the base Talking state is very different, e.g., if Surprised 2505c and Talking 2505b base states are so dissimilar that the character need first transition through Neutral base state 2505e to reach the Talking base state 2505b. Accordingly, in some embodiments the content creators may create expression specific talking animations 2520a, 2525a that may be reached within an expression group. Not all animation members of the Talking group 2530b may be recreated in this fashion. In some embodiments, only the most commonly recurring talking animations may be recreated and only for those expressions in which they are most likely to appear. The client device may similarly only retrieve all the talking animations within an expression group when bandwidth and processing considerations permit.

The transitions depicted in the state machine 2500 may be generated automatically following content creation. The system may first identify groups based upon metadata provided by the content creators. The metadata may also specify base states for the group. The system may determine the disparities between initial and final frames between different animations and form the associations between states depicted in FIG. 25. For example, a threshold distance between keyframes may be provided by the content creator—transitions may be permitted between animations where the distance is below the threshold.

The state machine transition information may be included in the metadata transmitted to the user device. Transition distances (e.g., the number of hops between states) may be taken into consideration when deciding which assets to download first (e.g., to select talking animations associated with an expression when there are many hops to the Talking base state).

Voice Acting-Animation Correspondence and Tagging

Figure 26:
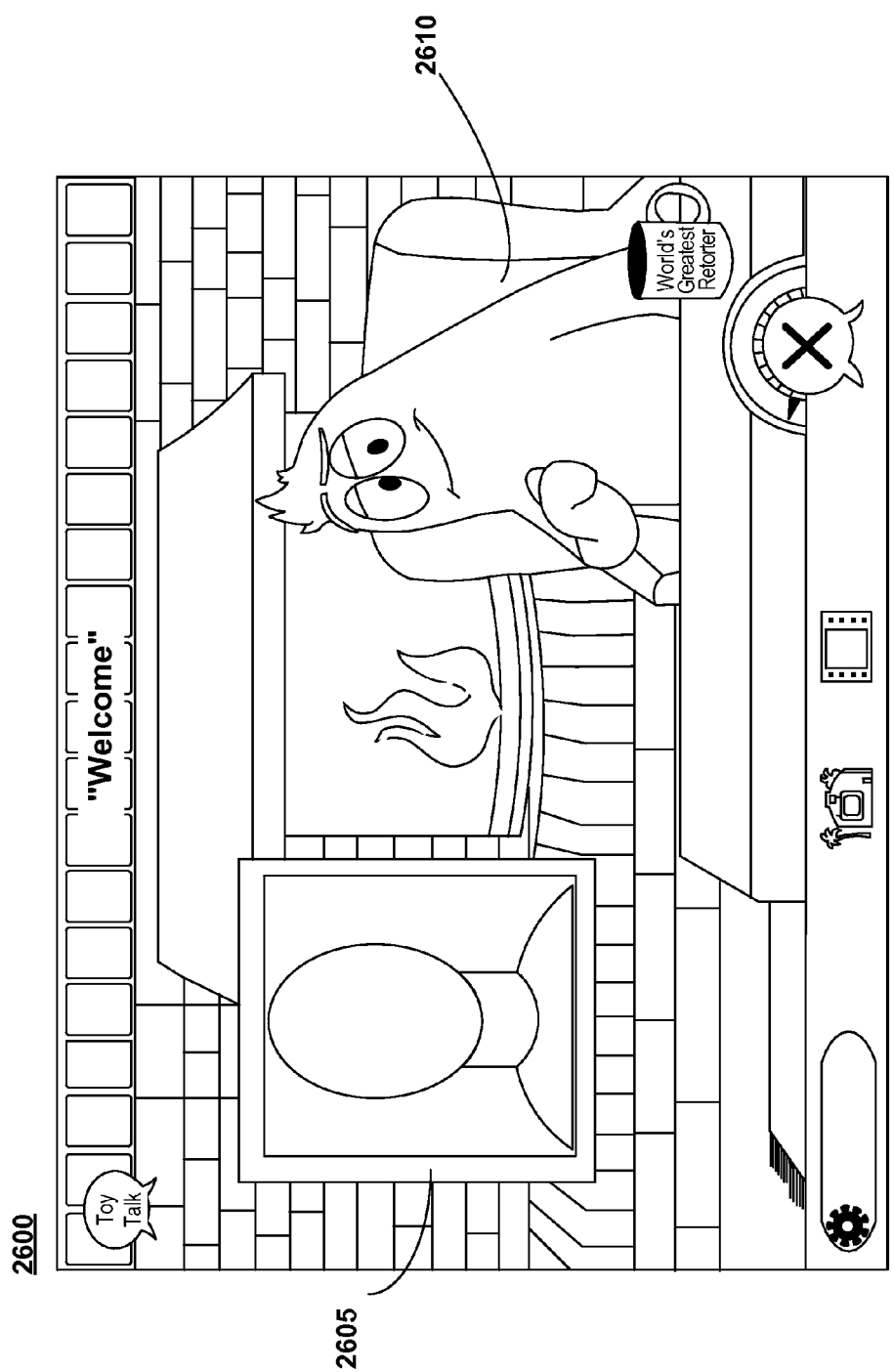
FIG. 26 is a screen shot of the rendered animation scene as may appear at a user device in some embodiments.

FIG. 26 is a screen shot of the rendered "fireside chat" animation scene 2600 as may appear at a user device in some embodiments. Here, video of the user 2605 is taken simultaneously while the character's interaction animations 2610 are performed. For example, this scene may occur in a trail where the user is a "guest" on a show hosted by the character. While some trails may involve little user interaction, conversational trails such as this example, may involve considerable user input. Processing that input may occur locally or at the server device. Generally, receiving the user waveform may be a less computationally intensive period, at least prior to processing the waveform. Accordingly, this "downtime" may be used to retrieve related assets and to anticipate transitions to new trails.

In contrast, a long sequence of non-user interaction may require considerable processing and asset collection in advance, to facilitate a smooth and continuous user experience. For example, FIG. 27 is an example conversation flow between characters as may occur in some embodiments. The future trail metadata pulled from the server may include an indication of the duration of non-user interactions such as the dialogue 2700. The user system may recognize that this interaction is not interrupted by user input, or at least not interrupted for a sufficiently long period. Accordingly, assets required during and following the interaction should be more highly prioritized for acquisition.

Dialogue 2700 is also indicative of the type of interactions that may occur between characters, requiring different expressions at different points in conversation and correspondingly different animations and assets (e.g., skeletal and texture keyframe information and meshes). Such interactions can be particularly difficult to generate rapidly using traditional tool systems as not one, but two, three, four, and sometimes many more characters are simultaneously reacting and interacting before the user. Accordingly, various embodiments contemplate content generation tools that will "tag" and consolidate different subassets in such a manner as to facilitate rapid content generation, which may also be readily interpreted by the client device to efficiently anticipate future trail requirements.

Figure 28:
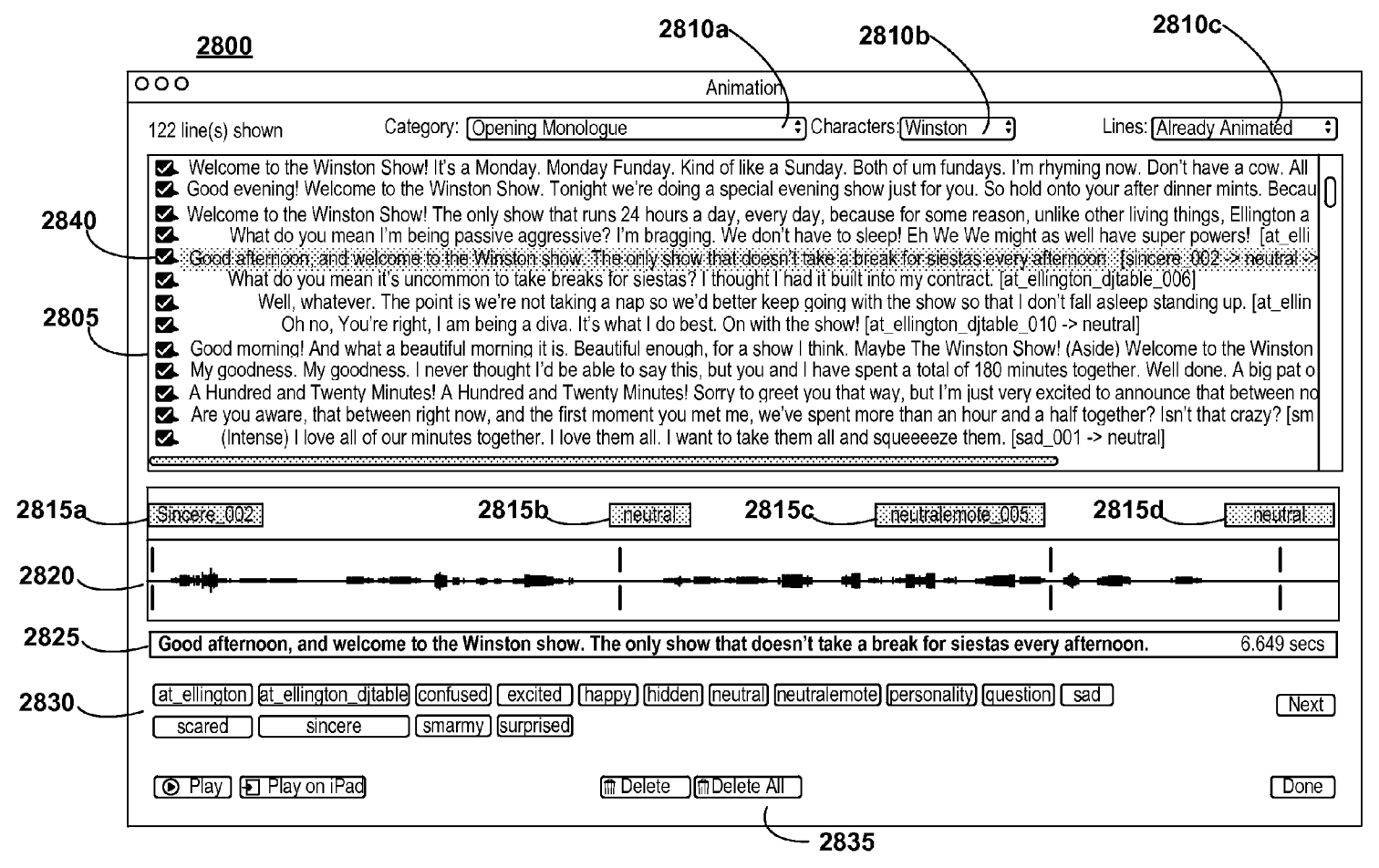

FIG. 28 is a screenshot 2800 for an interface to generate and tag audio assets for a single character as implemented in some embodiments. Drop-down icons 2810*a*-*c* may allow a content creator to select the relevant portion of trail 2810*a*, the character for which metadata tags are to be created 2810, and the status or the spoken line 2810*c*. Selecting these items may present a list of the lines appearing in the dialogue in region 2805. By selecting one of the lines of dialogue 2840 a textual representation of the line may appear at region 2825 and a waveform of a voice actor's performance, if available, in the region 2820. The user may then select from available animation states 2830 to insert tags 2815*a*-*d* at positions of the waveform to specify the appropriate character animations. The content creator can listen to the waveform, view the combined resultant asset, or remove the asset, by selecting appropriate icons in region 2835. As tags are applied, the representation of the dialogue line in region 2805 may present a summary of the transitions (e.g., "sincere_002→neutral→neutralremote_005").

Figure 29:
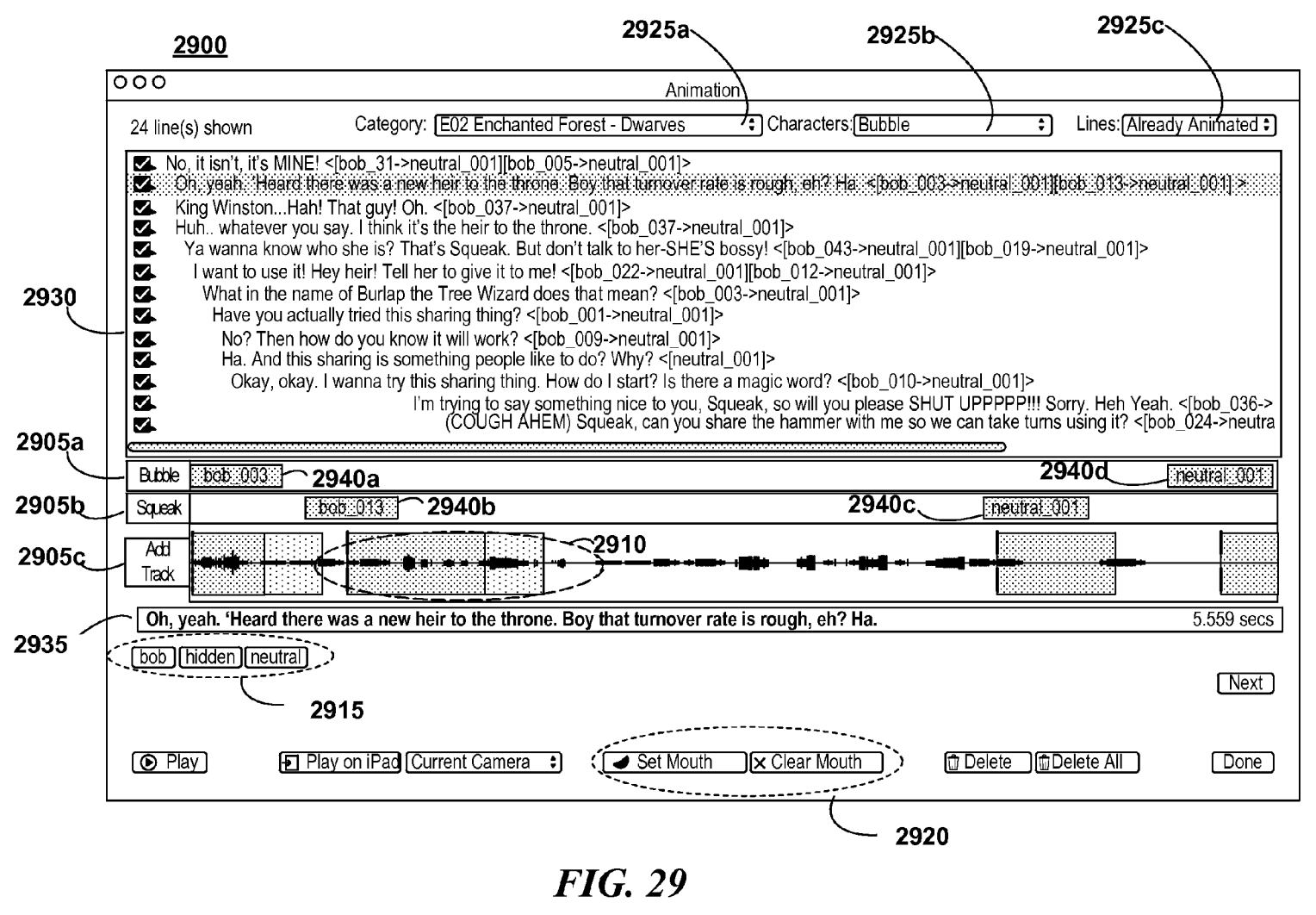

While suitable for animating one character at a time, it may be difficult to rapidly generate animations involving many characters using the interface of FIG. 28. FIG. 29 is a screenshot for an interface 2900 to generate and tag audio assets for multiple characters as implemented in some embodiments. This interface may present the audio waveform 2905*c* of one or more dialog lines. Some embodiments may allow the animator to perform coarse level tagging, e.g., "neutral", or specific level tagging, e.g., "sincere_002" at various points along the waveform. When a coarse tagging is used, the user's device may automatically pick a specific animation to use at run-time (this may allow dynamic flexibility at the user device to use whatever animation assets are readily at hand).

Multi-layer tagging of animation, such as tagging body animations separately from facial animations may be performed on different layers. This may allow a small library of animations to be combined together in different ways to produce a greater diversity of performances. Programmatic animations (e.g., lip synchronization with the phonetic animations and "keep alive" animations during quiescent periods) may be layered with manually crafted animation to facilitate the more rapid creation of complex animation effects.

As discussed elsewhere herein, audio and animation data may be streamed for a character to a user's device on an as-needed basis. This may allow for massive volumes of data to be used that cannot fit on the user's device as a whole. Some embodiments dynamically update the audio and animation data for a character in the cloud such that the user's device can download any new data as soon as it appears, thus keeping the character's performance fresh and different. Each of these operates may be specified, enhanced, or clarified via metadata created using an interface similar to interface 2900. Such metadata may also be specified by hand (e.g., by modifying an XML file).

These methods may focus animation effort on high-priority lines rather than on deep hierarchy lines that are less relevant. Similar to FIG. 28, drop-down icons 2925*a*-*c* may allow a content creator to select the relevant portion of trail 2925*a*, the character for which metadata tags are to be created 2925*b*, and the status of the spoken line 2925*c*. Selecting these items may present a list of the lines appearing in the dialogue in region 2930. Region 2930 may organize the lines, as in FIG. 28, to focus the animator's efforts on higher-level, more frequently encountered trail content, than upon more obscure, deep-hierarchy content.

By selecting one of the lines of dialogue 2930 a textual representation of the line may appear at region 2935 and a waveform of one or more voice actor's performances, if available, in the region 2905*c*. The user may then select from available animation states 2915 to insert tags 2940*a*-*d* at positions of the waveform to specify the appropriate character animations. The content creator can listen to the waveform, view the combined resultant asset, or remove the asset, by selecting appropriate icons. In region 2920, specific phonetic and/or lip synchronization texture and mesh animations may be selected. These selections may be used to tag phonetic transitions in the character's speech animation, such that the animation is synchronized with the voice actor's waveform. As tags are applied, the representation of the dialogue line in the regions 2905*a*,*b* may present a summary of the transitions (e.g., "sincere_002→neutral→neutralremote_005").

As discussed, some embodiments provide multi-track editing of different characters using a pose library of animations clips instead of hand animating every line. For example, buckets of animations 2915 may be used. By specifying animations at a "bucket-level" rather than by specifying specific animation clips/keyframes, the client device may have more flexibly animation options. A state machine may be used to estimate clip length (e.g., based on the constituent animation lengths). A state machine may be used to estimate clip length by calculating the shortest sequence of animations needed to successfully transition between the two states and combine the constituent animation lengths.

Figure 30:
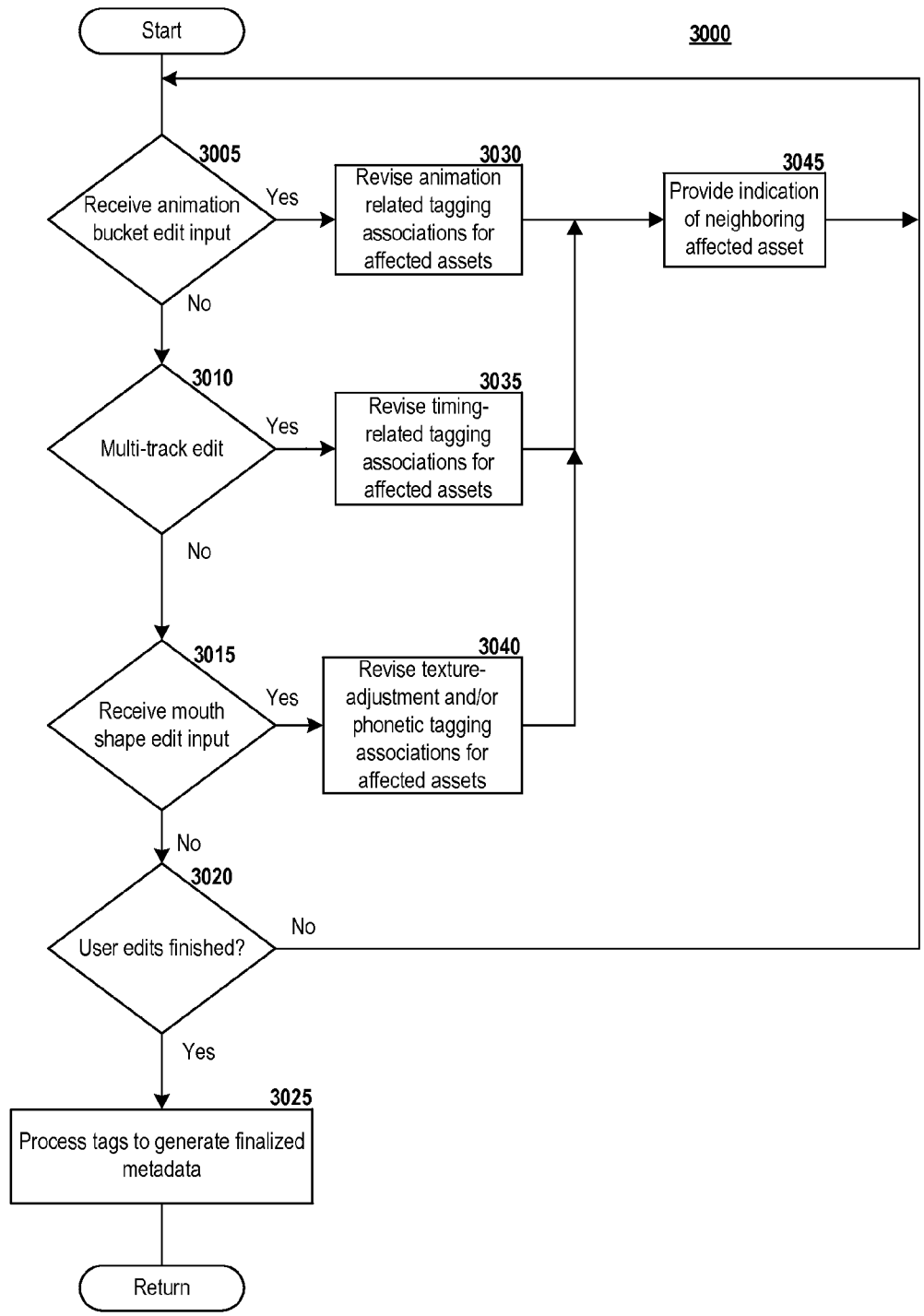
FIG. 30 is a flow diagram depicting the operations of a multiple-dialogue system as may be implemented in some embodiments.

FIG. 30 is a flow diagram depicting the operations of a multiple-dialogue system as may be implemented in some embodiments. At block 3005, the system may receive an input from the user requesting an animation bucket edit. For example, the user may request that a character transition to a new keyframe for a "Smarmy_Smiling" animation by dragging the "Smarmy_Smiling" from a collection of available animation keyframes at a point in the timeline. In response, at block 3030, the system may revise animation-related tagging associations for the affected assets. For example, the metadata may have previously indicated that quiescent, keep-alive animations were permitted at the point in the timeline. Now, however, the metadata may indicate that the character is to perform the "Smarmy_Smiling" animation state. Where a second character was monitoring the first character's animation state, the second character's state may be updated as well. For example, where the second character is to maintain eye contact with the first character, the animation metadata for the second character may adjust based upon the animation change to the first character. In this manner, "pose libraries" of animation keyframes may be used to render a scene, rather than relying on hand-drawn keyframes.

At block 3010, the system may receive a multi-track edit. For example, the user may specify that an animation is to occur at a different point along the timeline, that a portion of the waveform is to be cropped, relocated, compressed, receive a special effect, etc. At block 3035, the system may revise timing-related associations for the affected assets. For example, where a special effect was applied to the waveform, the portion of an animation associated with the portion of the waveform may be adjusted accordingly. In this manner, e.g., the content creator may specify when automatic phoneme recognition is to be performed, or adjusted, for a given piece of audio. Initially, the system may attempt to identify appropriate phonemes for the audio waveform, and may automatically select appropriate keyframe and texture animations for a character. However, subsequent animation keyframes, e.g., the "Smarmy_Smiling" keyframe, may disrupt the smooth transitions between the automatically generated keyframes. Accordingly, the content creator may need to manually replace or relocate the automatic phoneme keyframes to generate smoother interpolations.

To facilitate smoother transitions, the content creator may select between alternative sets of mouth shapes for different emotions. For example, at block 3015, the system may receive a mouth shape (or other texture) edit input. At block 3040, the system may adjust the metadata corresponding to the phonetic tagging associations at affected assets. For example, where a user inserts two disparate phonetic tags, the system may indicate in the metadata an intermediate (possibly interpolated) phonetic animation between the two disparate phonetic tags that can be retrieved and applied by the client when higher resolution assets are desired.

At block 3020, the system may determine if the user has finished editing the metadata. If so, at block 3025, the system may perform any finalized processing before generating the final, output metadata. For example, the system may indicate higher and lower available resolutions of the tagged assets, trail and asset relations, asset sizes and proposed download orders, etc. Other finalizing steps may include: converting assets to more compact file formats, computing checksums (e.g., MD5) to facilitate efficient checks for new asset versions, calculate the length of time an asset can be played, and uploading all these data to the cloud server.

Real-Time Updates

Some embodiments facilitate the delivery of software and system updates across the network in a manner analogous to the delivery of animation and audio packet data. Some embodiments facilitate the delivery of animation and audio data across the network in a manner analogous to the delivery of software and system updates.

Monitoring User Interaction

In some embodiments the system may monitor user interactions with the animated character, and adjust future interactions based thereon. For example, a local record of animations played and responses given may be maintained at a user device and periodically transmitted to the server. In some embodiments, the server also monitors the delivered assets to the user device and infers user preferences and behavior based thereon. For example, where users spend more time interacting with the system when certain animations are used, the system may adapt to preferentially select those animations for future streaming.

Lip Synchronization

Various of the disclosed embodiments contemplate economizing bandwidth by dynamically adjusting character animations based on audio phonemes. For example, rather than transmit keyframe after keyframe to a user device, or entire animation sequences, to correspond to an audio sequence, the system may dynamically adjust the character's model to create animations corresponding to audio in real-time.

Not only does this reduce the imposition on bandwidth resources, but it may also reduce the development efforts required by voice artists and animators.

Keep-Alive Data

Various of the disclosed embodiments contemplate animations which may operate on selective portions (or the entirety) of the character to create the impression of an autonomous living being. For example, included among the "Happy" and "Neutral" animations of FIG. 23 may also be "Keep-alive" datasets. When the animated character poses a question to a user, the user may be dilatory in their response. Rather than wait impassively, the animation engine may consult "keep-alive" data streamed across the network. The streamed data may include various animations, or subset animations (selective keyframe information for parts of the character's body). The animation engine may apply various of these keep-alive datasets to "keep the character alive", e.g., giving the impression that they are an autonomous being awaiting a response (coughing, looking about the room, shuffling their feet, folding their arms, etc.).

Computer System

Figure 31:
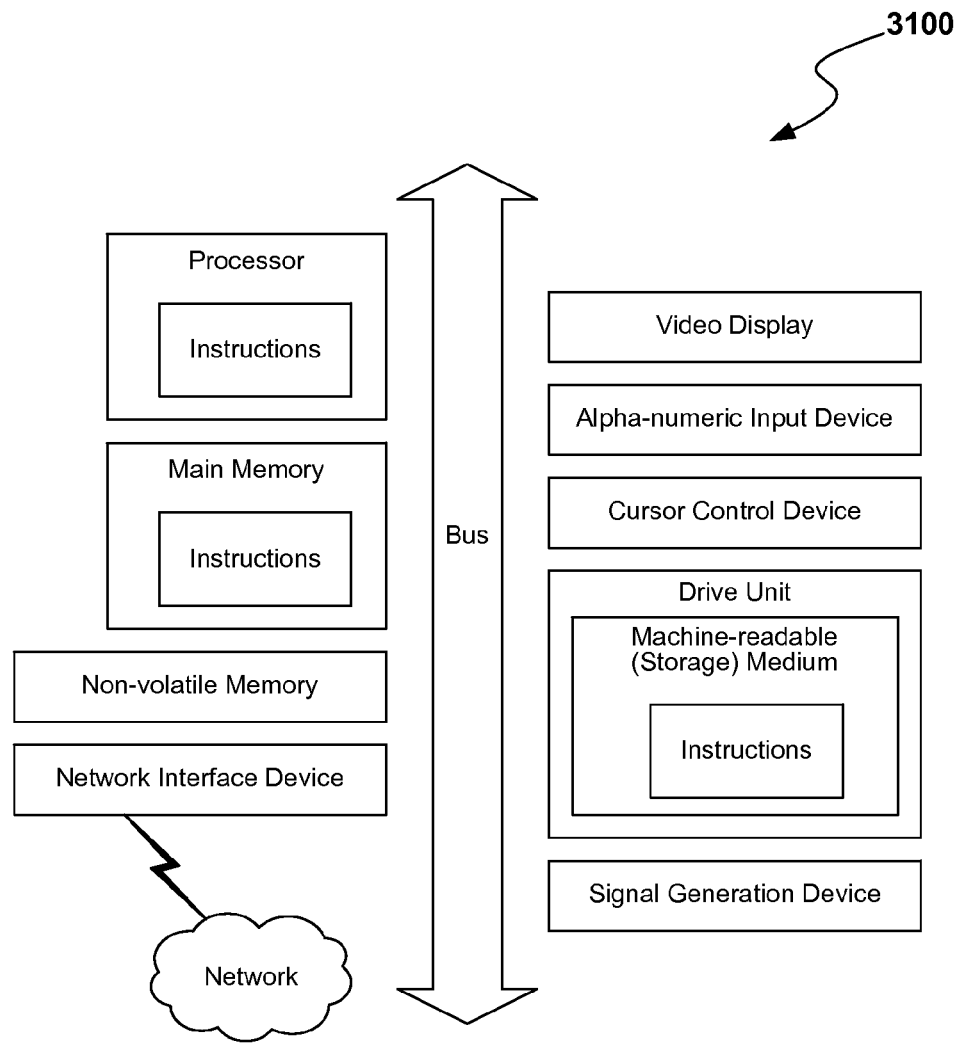
FIG. 31 shows a diagrammatic representation of a machine in the example form of a computer system within which a set of instructions for causing the machine to perform any one or more of the methodologies discussed herein may be executed.

FIG. 31 shows a diagrammatic representation of a machine 3100 in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 3100 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. he firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Remarks

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only some aspects of the disclosure may be recited as a means-plus-function claim under 35 U.S.C. §112, ¶6, other aspects may likewise be embodied as a means-plus-function claim, or in other forms, such as being embodied in a computer-readable medium (any claims intended to be treated under 35 U.S.C. §112, ¶6 will begin with the words "means for"). Accordingly, the applicant reserves the right to add additional claims after filing the application to pursue such additional claim forms for other aspects of the disclosure.

What is claimed is:

1. A computer-implemented method for presenting multimedia content to a user via an application executed by a user device, the method comprising:
   determining a current state in a trail, wherein the trail represents a pursuable path of an interactive experience enabled by the application;
   determining a first resource capability associated with the user device by
      identifying multimedia assets that are related to the current state and maintained by the user device, and
      notifying a server of the current state, the multimedia assets, or both;
   determining bandwidth available to the user device;
   determining a likelihood of transition from the current state to a future state;
   upon determining the likelihood of transition exceeds a threshold,
      identifying an asset to be used by the application in the future state;
      determining an appropriate resolution of the asset based at least in part on the bandwidth available to the user device;
      retrieving the asset at the appropriate resolution across a network from the server; and
      storing the asset locally at the user device.

2. The computer-implemented method of claim 1, wherein the asset comprises an animation, and wherein determining the appropriate resolution comprises:
   determining a number of keyframe vertex meshes needed to coordinate movement of a character model associated with the animation; and
   determining a size of a vertex mesh for the character model.

3. The computer-implemented method of claim 1, wherein the asset comprises an animation, and wherein determining the appropriate resolution comprises:
   determining a level of compression of a texture to be used by the application in the future state.

4. The computer-implemented method of claim 1, wherein determining the likelihood of transition comprises consulting metadata indicating the behavior of other users, and wherein each of the other users is associated with a distinct instance of the application that is executed by a distinct user device.

5. The computer-implemented method of claim 1, wherein determining the likelihood of transition comprises consulting metadata indicating a preference previously specified by the user.

6. The computer-implemented method of claim 1, further comprising determining a size of the asset and a priority of the asset.

7. The computer-implemented method of claim 6, wherein retrieval of the asset is prioritized over other assets that could be used by the application in the future state if the size of the asset exceeds a threshold or if the asset is determined to be a high priority asset.

8. A non-transitory computer-readable medium comprising instructions configured to cause at least one processor to perform a method comprising:
   executing an application that facilitates interactions between a user and an animated character;
   determining a current state in a trail, wherein the trail represents a pursuable path of an interactive experience enabled by the application;
   determining a first resource capability associated with a user device;
   determining bandwidth available to the user device;
   determining a likelihood of transition from the current state to a future state;
   determining an appropriate resolution of an asset to be used by the application in the future state,
      wherein the appropriate resolution is preemptively determined based at least in part on the bandwidth available to the user device;
   retrieving the asset at the appropriate resolution across a network from a server; and
   storing the asset locally at the user device.

9. The non-transitory computer readable medium of claim 8, wherein the asset comprises an animation, and wherein determining the appropriate resolution comprises:
   determining a number of keyframe vertex meshes needed to coordinate movement of a character model associated with the animation; and
   determining a size of a vertex mesh for the character model.

10. The non-transitory computer readable medium of claim 8, wherein the asset comprises an animation, and wherein determining the appropriate resolution comprises:
    determining a level of compression of a texture to be used by the application in the future state.

11. The non-transitory computer readable medium of claim 8, wherein determining the likelihood of transition comprises consulting metadata indicating the behavior of other users, and wherein each of the other users is associated with a distinct instance of the application that is executed by a distinct user device.

12. The non-transitory computer readable medium of claim 8, wherein determining the likelihood of transition comprises consulting metadata indicating a preference previously specified by the user.

13. The non-transitory computer readable medium of claim 8, the method further comprising determining a size of the asset and a priority of the asset.

14. The non-transitory computer readable medium of claim 8, wherein said determining the first resource capability associated with the user device comprises:
    identifying multimedia assets that are related to the current state and maintained by the user device; and
    notifying the server of the current state, the multimedia assets, or both.

15. A computer system comprising:
    at least one processor;
    at least one memory comprising instructions configured to cause the at least one processor to perform a method comprising:
       determining a current state in a trail, wherein the trail represents a pursuable path of an interactive experience;
       determining a first resource capability associated with a user device;
       determining a likelihood of transition from the current state to a future state;
       determining an appropriate resolution of an asset to be used in the future state,
          wherein the appropriate resolution is preemptively determined based at least in part on bandwidth available to the user device;

retrieving the asset at the appropriate resolution across a network from a server; and storing the asset locally at the user device.

16. The computer system of claim 15, wherein the asset comprises an animation, and wherein determining the appropriate resolution comprises:

determining a number of keyframe vertex meshes needed to coordinate movement of a character model associated with the animation; and determining a size of a vertex mesh for the character model.

17. The computer system of claim 15, wherein the asset comprises an animation, and wherein determining the appropriate resolution comprises:

determining a level of compression of a texture to be used in the future state.

18. The computer system of claim 15, wherein determining the likelihood of transition comprises consulting metadata indicating the behavior of other users, and wherein each of the other users is associated with a distinct user device.

19. The computer system of claim 15, wherein determining the likelihood of transition comprises consulting metadata indicating a preference previously specified by a user associated with the user device.

20. The computer system of claim 15, the method further comprising determining a size of the asset and a priority of the asset.

* * * * *